United States Patent [19]

Moriyama et al.

[11] Patent Number: 6,067,282

[45] Date of Patent: *May 23, 2000

[54] INFORMATION RECORDING MEDIUM, APPARATUS FOR RECORDING THE SAME AND APPARATUS FOR RECORDING THE SAME

[75] Inventors: Yoshiaki Moriyama, Tsurugashima; Takao Sawabe, Tokyo-to; Ryuichiro Yoshimura, Tokorozawa; Kaoru Yamamoto; Akihiro Tozaki, both of Tsurugashima; Junichi Yoshio, Tokorozawa; Hirohide Kobori, Tokorozawa; Takeshi Iwase, Tokorozawa; Hiroki Yamanashi; Hisayuki Nakayama, both of Tokyo-to, all of Japan

[73] Assignee: Pioneer Electronic Corporation, Tokyo, Japan

[*] Notice: This patent is subject to a terminal disclaimer.

[21] Appl. No.: 09/247,560

[22] Filed: Feb. 10, 1999

Related U.S. Application Data

[63] Continuation of application No. 08/825,560, Mar. 20, 1997, Pat. No. 5,889,746.

[30] Foreign Application Priority Data

Mar. 25, 1996 [JP] Japan .................................. P08-68730

[51] Int. Cl.$^7$ ...................................................... G11B 3/90
[52] U.S. Cl. ............................................... 369/58; 386/97
[58] Field of Search ................................ 369/47, 48, 58; 386/97, 106, 126, 125, 95

[56] References Cited

U.S. PATENT DOCUMENTS

| | | | |
|---|---|---|---|
| 5,040,110 | 8/1991 | Miki et al. | 369/111 |
| 5,627,657 | 5/1997 | Park | 369/32 |
| 5,636,200 | 6/1997 | Taira et al. | 369/275.3 |
| 5,721,720 | 2/1998 | Kikuchi et al. | 369/275.3 |
| 5,774,583 | 6/1998 | Sasaki et al. | 369/14 |
| 5,778,142 | 7/1998 | Taira et al. | 386/97 |
| 5,813,010 | 9/1998 | Kurano et al. | 369/272 |
| 5,889,746 | 3/1999 | Moriyama et al. | 369/58 |

*Primary Examiner*—Thang V. Tran
*Attorney, Agent, or Firm*—Morgan, Lewis & Bockius LLP

[57] ABSTRACT

An information recording medium includes: record information pieces logically independent of each other and constituting a hierarchical structure of hierarchical layers; layer information pieces for specifying one of the hierarchical layer; kind information pieces for indicating kinds of information relating to the record information pieces; a text group including layer related texts and record information related texts successively arranged in a mixed manner; text arrangement information pieces corresponding to the text group and arranged in pair with one of the layer information piece and the kind information piece corresponding to the text, the text arrangement information piece indicating a position of the text within the text group. The layer information pieces are arranged in an order in accordance with the hierarchical structure, and the kind information pieces are arranged in pair with the layer information pieces indicating the layer of the corresponding record information piece so as to specify the logical position of the corresponding record information piece within the hierarchical structure.

8 Claims, 27 Drawing Sheets

STRUCTURE OF INTERLEAVED UNIT

IU : INTERLEAVED UNIT

FIG. 6

| OFFSET | 0 | 16 | 32 |
|---|---|---|---|
| CODE | HIARACHICAL CODE | MAIN-ITEM CODE | SUB-ITEM CODE |
| 0 | VOLUME | AUDIO | CHANNEL |
| 1 | TITLE | SUB-PICTURE | <RESERVE> |
| 2 | PARENTAL-ID | ANGLE | <RESERVE> |
| 3 | PART OF TITLE | <RESERVE> | <RESERVE> |
| 4 | CELL | <RESERVE> | <RESERVE> |
| 5 | <RESERVE> | <RESERVE> | <RESERVE> |
| 6 | <RESERVE> | <RESERVE> | <RESERVE> |
| 7 | <RESERVE> | <RESERVE> | <RESERVE> |
| 8 | <RESERVE> | <RESERVE> | <RESERVE> |
| 9 | <RESERVE> | <RESERVE> | <RESERVE> |
| 10 | <RESERVE> | <RESERVE> | <RESERVE> |
| 11 | <RESERVE> | <RESERVE> | <RESERVE> |
| 12 | UNIQUE CODE | UNIQUE CODE | UNIQUE CODE |
| 13 | UNIQUE CODE | UNIQUE CODE | UNIQUE CODE |
| 14 | UNIQUE CODE | UNIQUE CODE | UNIQUE CODE |
| 15 | UNIQUE CODE | UNIQUE CODE | UNIQUE CODE |

FIG. 7A

| CLASS | APPLICATION ITEM | CODE (FULLNAME) | CODE(SORTING) |
|---|---|---|---|
| PIECE | SERIES NAME | 48 | 49 |
| | PRODUCTION NAME | 50 | 51 |
| | SUB-PRODUCTION NAME | 52 | 53 |
| | ORIGINAL LANGUAGE | 54 | 55 |
| | ORIGINAL PRODUCTION NAME | 56 | 57 |
| | ORIGINAL PRODUCTION SUB-NAME | 58 | 59 |
| | ORIGINAL SCREEN SIZE | 60 | 61 |
| | LOCATION | 62 | 63 |
| | PRODUCING COUNTRY | 64 | 65 |
| | PRODUCING FIRM | 66 | 67 |
| | PRODUCING STUDIO | 68 | 69 |
| | SUBJECT NAME | 70 | 71 |
| | SUB-SUBJECT NAME | 72 | 73 |
| | PRIZE | 74 | 75 |
| | SCENE NAME | 76 | 77 |
| | CUT NAME | 78 | 79 |
| | | | |
| PEOPLE | MAIN ACTOR | 82 | 83 |
| | MAIN ACTRESS | 84 | 85 |
| | SUPPORT ACTOR | 86 | 87 |
| | SUPPORT ACTRESS | 88 | 89 |
| | OTHER ACTOR | 90 | 91 |
| | PRODUCER | 92 | 93 |
| | DIRECTOR | 94 | 95 |
| | PLAYWRIGHT | 96 | 97 |
| | WRITER | 98 | 99 |
| | ARTIST | 100 | 101 |
| | VOCALIST | 102 | 103 |
| | CONDUCTOR | 104 | 105 |
| | LYRIC WRITER | 106 | 107 |
| | SONG WRITER | 108 | 109 |
| | ARRANGER | 110 | 111 |
| | PLAYERS | 112 | 113 |
| | PLAYER | 114 | 115 |
| | MUSIC PRODUCER | 116 | 117 |

FIG. 7B

| CLASS | APPLICATION ITEM | CODE (FULLNAME) | CODE (SORTING) |
|---|---|---|---|
| DATE | PRODUCTION | 1 4 2 | 1 4 3 |
| | OPEN | 1 4 4 | 1 4 5 |
| | PRIZE | 1 4 6 | 1 4 7 |
| | | 1 4 8 | 1 4 9 |
| OBJECT | TARGET AGE | 1 5 0 | 1 5 1 |
| | OBJECT LANGUAGE | 1 5 2 | 1 5 3 |
| | | | |
| VOCAL | MALE MAIN VOCAL | 1 5 6 | 1 5 7 |
| | MALE SUB VOCAL | 1 5 8 | 1 5 9 |
| | OTHER MALE VOCAL | 1 6 0 | 1 6 1 |
| | FEMALE MAIN VOCAL | 1 6 2 | 1 6 3 |
| | FEMALE MAIN VOCAL | 1 6 4 | 1 6 5 |
| | OTHER FEMALE VOCAL | 1 6 6 | 1 6 7 |
| | | | |
| GENRE | VIDEO GENRE | 1 6 8 | 1 6 9 |
| | MUSIC / KARAOKE | 1 7 0 | 1 7 1 |
| | SUB GENRE | 1 7 2 | 1 7 3 |
| | | | |
| WORDS | SONG INTORDUCTION PART | 1 7 6 | 1 7 7 |
| | FAMOUS PHRASE | 1 7 8 | 1 7 9 |
| | LINER NOTE | 1 8 0 | 1 8 1 |
| | ORIGINAL | 1 8 2 | 1 8 3 |
| | SCENARIO | 1 8 4 | 1 8 5 |
| | LYRICS | 1 8 6 | 1 8 7 |

FIG. 7C

| CLASS | APPLICATION ITEM | CODE (FULLNAME) | CODE(SORTING) |
|---|---|---|---|
| OTHERS | | 1 8 8 | 1 8 9 |
| MANAGE | DISC SET No. | 1 9 0 | 1 9 1 |
| | DISC No. | 1 9 2 | 1 9 3 |
| | LENTAL START DATE | 1 9 4 | 1 9 5 |
| | RELEASE DATE | 1 9 6 | 1 9 7 |
| | ISRC CODE | 1 9 8 | 1 9 9 |
| | CGMS | 2 0 0 | 2 0 1 |
| | | | |
| UNIQUE | UNIQUE CODE | 2 2 4 | 2 2 5 |
| | UNIQUE CODE | 2 2 6 | 2 2 7 |
| | UNIQUE CODE | 2 2 8 | 2 2 9 |
| | UNIQUE CODE | 2 3 0 | 2 3 1 |
| | UNIQUE CODE | 2 3 2 | 2 3 3 |
| | UNIQUE CODE | 2 3 4 | 2 3 5 |
| | UNIQUE CODE | 2 3 6 | 2 3 7 |
| | UNIQUE CODE | 2 3 8 | 2 3 9 |
| | UNIQUE CODE | 2 4 0 | 2 4 1 |
| | UNIQUE CODE | 2 4 2 | 2 4 3 |

FIG. 8

| GENRE CLASS | CONTENTS | TEXT CODE | GENRE CLASS | CONTENTS | TEXT CODE |
|---|---|---|---|---|---|
| MOVIE | ACTION | 0 0 1 | SUB-GENRE | CM SONG | 2 0 0 |
| | MUSICAL | 0 0 2 | | TV SONG | 2 0 1 |
| | NON-FICTION | 0 0 3 | | ANIMATION SONG | 2 0 2 |
| | DOCUMENTARY | 0 0 4 | | COMIC SONG | 2 0 3 |
| | FANTASY | 0 0 5 | | CHRISTMAS SONG | 2 0 4 |
| | COMEDY | 0 0 6 | | WEDDING SONG | 2 0 5 |
| | ANIMATION | 0 0 7 | | BIRTHDAY SONG | 2 0 6 |
| | MYSTERY | 0 0 8 | | SPRING | 2 0 7 |
| | SUSPENSE | 0 0 9 | | SUMMER | 2 0 8 |
| | HORROR | 0 1 0 | | AUTUMN | 2 0 9 |
| | LOVE ROMANCE | 0 1 1 | | WINTER | 2 1 0 |
| | FAMILY | 0 1 2 | | YACHT | 2 1 1 |
| | HOW TO | 0 1 3 | | SURFIN' | 2 1 2 |
| | PUZZLE | 0 1 4 | | SKI | 2 1 3 |
| | ADVENTURE | 0 1 5 | | SNOWBOARD | 2 1 4 |
| | ROCK | 1 0 1 | | HOKKAIDO | 2 1 5 |
| | POPS | 1 0 2 | | HOKURIKU | 2 1 6 |
| | JAZZ / FUSION | 1 0 3 | | SINNSYUU | 2 1 7 |
| | STANDARD | 1 0 4 | | MT. FUJI | 2 1 8 |
| | BLUES | 1 0 5 | | KOBE | 2 1 9 |
| | BALLAD | 1 0 6 | | SETOUTI | 2 2 0 |
| | FORK | 1 0 7 | | GENNKAINADA | 2 2 1 |
| | REGGAE | 1 0 8 | | NAGASAKI | 2 2 2 |

FIG. 10

|    | ITEM CODE CONTENTS | ITEM CODE | ITEM TEXT CONTENTS |
|----|--------------------|-----------|--------------------|
| 1  | VOLUME             | 0         | <OPTION>           |
| 2  | TITLE              | 1         | <OPTION>           |
| 3  | AP (PRODUCTION NAME) | 50      | STARWARS           |
| 4  | AP (DIRECTOR)      | 94        | GEORGE LUCAS       |
| 5  | AP (MAIN ACTOR)    | 82        | MARK HAMILL        |
| 6  | :                  | :         | :                  |
| 7  | PTT                | 3         | <OPTION>           |
| 8  | AP (SCENE NAME)    | 76        | LUKE & DARTH BADER BATTLE |
| 9  | PTT                | 3         | <OPTION>           |
| 10 | PTT                | 3         | <OPTION>           |
| 11 | AP (SCENE NAME)    | 76        | PRINCESS LEIA RELEASED |

FIG. 12

|    | ITEM CODE CONTENTS | ITEM CODE | ITEM TEXT CONTENTS |
|----|--------------------|-----------|--------------------|
| 1  | VOLUME             | 0         | <OPTION>           |
| 2  | AP (PRODUCTION NAME) | 50      | SEIKO MATSUDA COLLECTION |
| 3  | AP (ARTIST)        | 100       | SEIKO MATSUDA      |
| 4  | :                  | :         | :                  |
| 5  | :                  | :         | :                  |
| 6  | :                  | :         | :                  |
| 7  | TITLE              | 1         |                    |
| 8  | AP (SUBJECT NAME)  | 70        | SUPREME            |
| 9  | AP (ARTIST)        | 100       | MATSUDA SEIKO      |
| 10 | AP (SONG WRITER)   | 108       | ○○○○               |
| 11 | :                  | :         | :                  |
| 12 | PTT                | 3         |                    |
| 13 | AP (SUBJECT NAME)  | 70        | GRASS WITH FIREFLY |
| 14 | AP (ARTIST)        | 100       | MATSUDA SEIKO      |
| 15 | AP (SONGWRITER)    | 108       | ○○○○               |
| 16 | :                  | :         | :                  |
| 17 | PTT                | 3         | :                  |
| 18 | :                  | :         | :                  |
| 19 | PTT                | 3         | :                  |
| 20 | :                  | :         | :                  |
| 21 | TITLE              | 1         |                    |
| 22 | AP (PRODUCTION NAME) | 50      | STRAWBERRY TIME    |
| 23 | AP (ARTIST)        | 100       | MATSUDA SEIKO      |
| 24 | :                  | :         | :                  |
| 25 | PTT                | 3         |                    |
| 26 | AP (SUBJECT NAME)  | 70        | STRAWBERRY TIME    |
| 27 | AP (ARTIST)        | 100       | MATSUDA SEIKO      |
| 28 | AP (SONG WRITER)   | 108       | ○○○○               |

FIG. 14

| | ITEM CODE CONTENTS | ITEM CODE | ITEM TEXT CONTENTS |
|---|---|---|---|
| 1 | VOLUME | 0 | <OPTION> |
| 2 | AP (PRODUCTION NAME) | 50 | KARAOKE COLLECTION |
| 3 | AP (ARTIST) | 100 | HORIUCHI TAKAO |
| 4 | AP (ARTIST) | 100 | OOTUKI / SAKAMOTO |
| 5 | : | : | : |
| 6 | TITLE | 1 | <OPTION> |
| 7 | AP (SUBJECT NAME) | 70 | DREAMY ROUNDABOUT |
| 8 | AP (ARTIST) | 100 | HORIUCHI TAKAO |
| 9 | : | : | : |
| 10 | AUDIO | 16 | <OPTION> |
| 11 | CHANNEL | 32 | <OPTION> |
| 12 | CHANNEL | 32 | <OPTION> |
| 13 | CHANNEL | 32 | <OPTION> |
| 14 | CHANNEL | 32 | <OPTION> |
| 15 | AP (MALE MAIN VOCAL) | 156 | HORIUCHI TAKAO |
| 16 | : | : | : |
| 17 | TITLE | 1 | <OPTION> |
| 18 | AP (SUBJECT NAME) | 70 | LOVE ...PART II |
| 19 | AP (ARTIST) | 100 | OOTUKI / SAKAMOTO |
| 20 | : | : | : |
| 21 | AUDIO | 16 | <OPTION> |
| 22 | CHANNEL | 32 | <OPTION> |
| 23 | CHANNEL | 32 | <OPTION> |
| 24 | CHANNEL | 32 | <OPTION> |
| 25 | CHANNEL | 32 | <OPTION> |
| 26 | AP (MALE VOCAL) | 156 | SAKAMOTO TOSHIAKI |
| 27 | CHANNEL | 32 | <OPTION> |
| 28 | AP (FEMALE VOCAL) | 162 | OOTUKI MIYAKO |
| 29 | : | : | : |
| 30 | PTT | 3 | <OPTION> |
| 31 | AP (SONG INTRO) | 176 | YOU AND I ... |
| 32 | : | : | : |
| 33 | CELL | 4 | <OPTION> |
| 34 | AP (SONG INTRO) | 176 | YOU AND I ... |
| 35 | | | |

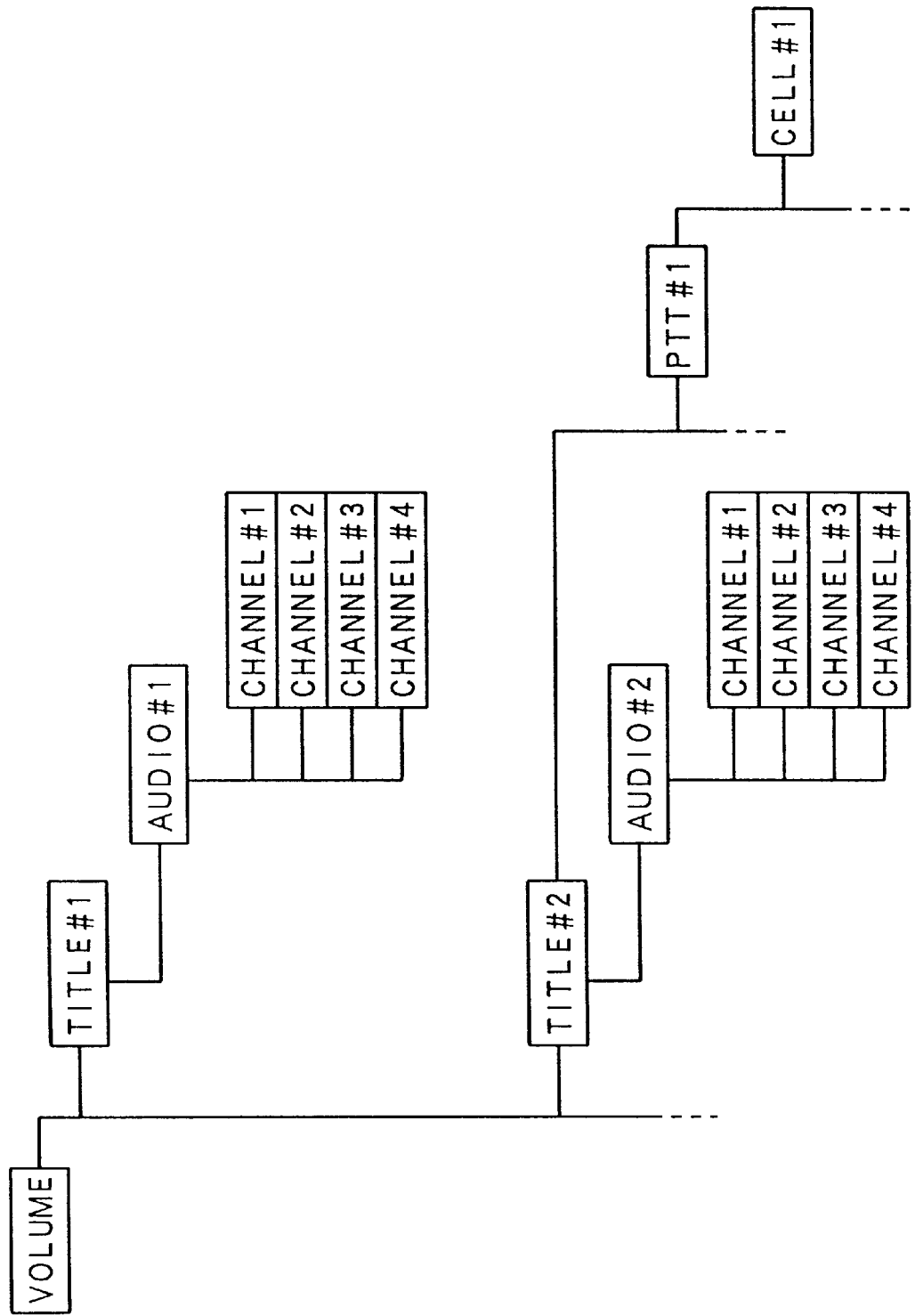

FIG. 16A

| CLASS | APPLICATION ITEM | CODE (FULLNAME) | CODE (SORTING) |
|---|---|---|---|
| PIECE | SERIES NAME | 48 | 49 |
|  | PRODUCTION NAME | 50 | 51 |
|  | SUB-PRODUCTION NAME | 52 | 53 |
|  | ORIGINAL LANGUAGE | 54 | 55 |
|  | ORIGINAL PRODUCTION NAME | 56 | 57 |
|  | ORIGINAL SUB-PRODUCTION NAME | 58 | 59 |
|  | ORIGINAL SCREEN SIZE | 60 | 61 |
|  | LOCATION | 62 | 63 |
|  | PRODUCING COUNTRY | 64 | 65 |
|  | PRODUCING FIRM | 66 | 67 |
|  | PRODUCING STUDIO | 68 | 69 |
|  | SUBJECT NAME | 70 | 71 |
|  | SUB-SUBJECT NAME | 72 | 73 |
|  | PRIZE | 74 | 75 |
|  | SCENE NAME | 76 | 77 |
|  | CUT NAME | 78 | 79 |
|  |  |  |  |
| PEOPLE | MAIN ACTOR | 82 | 83 |
|  | MAIN ACTRESS | 84 | 85 |
|  | SUPPORT ACTOR | 86 | 87 |
|  | SUPPORT ACTRESS | 88 | 89 |
|  | OTHER ACTOR | 90 | 91 |
|  | PRODUCER | 92 | 93 |
|  | DIRECTOR | 94 | 95 |
|  | PLAYWRIGHT | 96 | 97 |
|  | WRITER | 98 | 99 |
|  | ARTIST | 100 | 101 |
|  | VOCALIST | 102 | 103 |
|  | CONDUCTOR | 104 | 105 |
|  | LYRIC WRITER | 106 | 107 |
|  | SONG WRITER | 108 | 109 |
|  | ARRANGER | 110 | 111 |
|  | PLAYERS | 112 | 113 |
|  | PLAYER | 114 | 115 |
|  | MUSIC PRODUCER | 116 | 117 |

FIG. 16B

| CLASS | APPLICATION ITEM | CODE (FULLNAME) | CODE (SORTING) |
|---|---|---|---|
| DATE | PRODUCTION | 1 4 2 | 1 4 3 |
|  | OPEN | 1 4 4 | 1 4 5 |
|  | PRIZE | 1 4 6 | 1 4 7 |
|  |  | 1 4 8 | 1 4 9 |
| OBJECT | TARGET AGE | 1 5 0 | 1 5 1 |
|  | OBJECT LANGUAGE | 1 5 2 | 1 5 3 |
|  |  |  |  |
| VOCAL | MALE MAIN VOCAL | 1 5 6 | 1 5 7 |
|  | MALE SUB VOCAL | 1 5 8 | 1 5 9 |
|  | OTHER MALE VOCAL | 1 6 0 | 1 6 1 |
|  | FEMALE MAIN VOCAL | 1 6 2 | 1 6 3 |
|  | FEMALE MAIN VOCAL | 1 6 4 | 1 6 5 |
|  | OTHER FEMALE VOCAL | 1 6 6 | 1 6 7 |
|  |  |  |  |
| GENRE | VIDEO GENRE | 1 6 8 | 1 6 9 |
|  | MUSIC / KARAOKE | 1 7 0 | 1 7 1 |
|  | SUB GENRE | 1 7 2 | 1 7 3 |
|  |  |  |  |
| WORDS | SONG INTORDUCTION | 1 7 6 | 1 7 7 |
|  | FAMOUS PHRASE | 1 7 8 | 1 7 9 |
|  | LINER NOTE | 1 8 0 | 1 8 1 |
|  | ORIGINAL | 1 8 2 | 1 8 3 |
|  | SCENARIO | 1 8 4 | 1 8 5 |
|  | LYRICS | 1 8 6 | 1 8 7 |

FIG. 16C

| CLASS | APPLICATION ITEM | CODE (FULLNAME) | CODE(SORTING) |
|---|---|---|---|
| OTHERS | | 1 8 8 | 1 8 9 |
| MANAGE | DISC SET No. | 1 9 0 | 1 9 1 |
| | DISC No. | 1 9 2 | 1 9 3 |
| | LENTAL START DATE | 1 9 4 | 1 9 5 |
| | RELEASE DATE | 1 9 6 | 1 9 7 |
| | ISRC CODE | 1 9 8 | 1 9 9 |
| | CGMS | 2 0 0 | 2 0 1 |
| | | | |
| UNIQUE | JP LETTER COLUMN "あ (A)" | 2 2 4 | 2 2 5 |
| | JP LETTER COLUMN "か (KA)" | 2 2 6 | 2 2 7 |
| | JP LETTER COLUMN "さ (SA)" | 2 2 8 | 2 2 9 |
| | JP LETTER COLUMN "た (TA)" | 2 3 0 | 2 3 1 |
| | JP LETTER COLUMN "な (NA)" | 2 3 2 | 2 3 3 |
| | JP LETTER COLUMN "は (HA)" | 2 3 4 | 2 3 5 |
| | JP LETTER COLUMN "ま (MA)" | 2 3 6 | 2 3 7 |
| | JP LETTER COLUMN "や (YA)" | 2 3 8 | 2 3 9 |
| | JP LETTER COLUMN "ら (RA)" | 2 4 0 | 2 4 1 |
| | JP LETTER COLUMN "わ (WA)" | 2 4 2 | 2 4 3 |

FIG. 17

| ITEM CODE | ITEM TEXT |
|---|---|
| 2 2 4 | AMURO NAIME_BODY FEELS EXIT_07 |
| 2 2 4 | OOGURO MAKI_LA LA LA_12 |
| 2 2 6 | KA-PENTA-ZU_YESTERDAY ONCE MORE_15 |
| 2 2 6 | KUBO YURIKO_CONCRETE JUNGLE_09 |
| 2 2 8 | SAKAI NORIKOI_BLUE RABBIT_11 |
| 2 2 8 | SYARAN-Q_CANNY GIRL_01 |
| 2 2 8 | SUZUKI RANRAN_I WON'T CRY_14 |
| 2 3 0 | CHU-BU_UNFORGIVABLE SUMMER_03 |
| 2 3 0 | DORI-MUZUKAMUTURU-LOVE LOVE LOVE_03 |
| 2 3 4 | FUJII FUMIYA_HEART BREAK_02 |
| 2 3 4 | HUKUYAMA MASAHARU_LOOKING FOR THE WIND_05 |
| 2 3 4 | HOTEI TOMOYASU_THRILL_06 |
| 2 3 4 | HORIUCHI TAKAO_DREAMY ROUNDABOUT_15 |
| 2 3 6 | MISUTA-CHIRUDOREN_SONG WITHOUT A NAME_04 |
| 2 3 6 | MORITAKA CHISATO_HOLIDAY AFTERTNOON_10 |
| 2 4 2 | WATANABE MISATO_FURTHEST PLACE IN THE WORLD_13 |

DESCRIPTION STYLE:
    (ARTIST NAME)_(SONG NAME)_(TITLE No.)

FIG. 23

|  | ITEM CODE | ITEM TEXT |
|---|---|---|
| EXAMPLE 1 | 170 | 101_ROCK |
| EXAMPLE 2 | 170 | 101_POPS (60's) |
| EXAMPLE 3 | 170 | 101_POPS (70's) |
| EXAMPLE 4 | 170 | 101_FORK |

INFORMATION RECORDING MEDIUM, APPARATUS FOR RECORDING THE SAME AND APPARATUS FOR RECORDING THE SAME

This is a continuation of application Ser. No. 08/825,560 filed on Mar. 20, 1997 U.S. Pat. No. 5,889,746.

BACKGROUND OF THE INVENTION

1. Field of the Invention

The present invention relates to an information recording medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information recording medium, and a reproducing apparatus for reproducing the information from the information recording medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

In the application of video CD to a karaoke device, the text information (character information) relating to the recorded video information is recorded on the video CD, and the text information is displayed on a monitor to notify a user of the contents of the recorded video information and/or related information. In the case of the video CD, a portion on the disc is allotted to text information recording area in which the text information is recorded. The text information to be recorded is comprised of plural independent files each corresponding to a country for which the text is described (i.e., the files are prepared for each language), and each file includes a text relating to the whole contents of the disc and a plurality of texts relating to respective pieces of the recorded video information. Each text is applied with an identification number of itself.

However, according to the recording method of the text information described above, since the text information are simply recorded successively, it is difficult to rapidly recognize the recording position of a certain text information which is desired to be displayed. Therefore, it is required to check the contents of every text information one after another to find out the target text in a time-consuming manner.

In addition, since the text itself can be described only for the largest unit of the video information recorded on the disc, it is impossible to describe the text for further departmentalized information units. For example, in the case of the video CD on which plural stories are recorded, it is not possible to describe a text for each chapter and/or scene of each story, although it is possible to describe a text for each story.

SUMMARY OF THE INVENTION

It is therefore an object of the present invention to provide an information recording medium on which information can be recorded in a hierarchical structure and on which text information can also be recorded in relation with the recorded information at each hierarchical layer.

It is another object of the present invention to provide an apparatus for recording the information including the text information on the recording medium, and an apparatus for reproducing the recorded information, which is capable of searching for the text information quickly.

According to one aspect of the present invention, there is provided an information recording medium including: a plurality of record information pieces logically independent of each other and constituting a hierarchical structure including a plurality of hierarchical layers; layer information pieces for specifying one of the plurality of hierarchical layers; kind information pieces for indicating kinds of information relating to the record information pieces; a text group including a plurality of layer related texts and record information related texts successively arranged in a mixed manner, the layer related text describing information related to the layer specified by the layer information piece, the record information related text describing information related to the kind of the information specified by the kind information piece; text arrangement information pieces corresponding to the text group and arranged in pair with one of the layer information piece and the kind information piece corresponding to the text, the text arrangement information piece indicating a position of the text within the text group, wherein the layer information pieces are arranged in an order in accordance with the hierarchical structure, and the kind information pieces are arranged in pair with the layer information pieces indicating the layer of the corresponding record information piece so as to specify the logical position of the corresponding record information piece within the hierarchical structure.

In accordance with the recording medium thus configured, since the texts are related to the hierarchical structure by the layer information pieces, the texts can be recorded for each of the plural layers. Further, since the text arrangement information pieces are recorded, the search operation using the text may be readily performed.

The medium may further includes a plurality of specific layer information pieces indicating recording position of the layer information pieces which indicate one or more predetermined specific layers out of the plurality of hierarchical layers. By this, the recording positions of the layer information pieces indicating predetermined layers can be readily obtained by referring to the specific layer information pieces.

The medium may further includes uppermost layer information pieces indicating recording positions of the layer information pieces which indicate the highest layer out of the plurality of hierarchical layers. By this, the recording positions of the layer information pieces for the uppermost layer can be readily obtained.

The medium may further include relation information pieces indicating, for predetermined kind information pieces, relations between the record information related texts and logical positions of the record information pieces corresponding to the record information related texts within the hierarchical structure. By this, a rapid search can be achieved using the kind information pieces.

The medium may be so configured that the layer information piece indicates only the layers, out of the plurality of layers, including units of the record information pieces which a user can arbitrarily designates. With this treatment, the search of the texts corresponding to the record information designated by the user may be easy and quick.

The medium may be so configured that the layer information piece is recorded for a certain record information piece which satisfies the following conditions: (a) on a certain layer within the hierarchical layers lower than the predetermined specific layers, there exist other record information pieces on the layer which is at a same hierarchical level as the certain layer and which is branched from the layer just one level higher than the certain layer; and (b) there exists at least one text with respect to one of the certain record information piece and the other record information pieces and the layers lower than the certain layer. By this, all the existing layers can be accurately described with minimum number of description of the layer information pieces.

The medium may be so configured that the record information related text includes a classification mark part indicating a sub-class of the related information described by the text and a character part indicating the related information. By this, the quick search can be accomplished using the classification mark part in the record information related text.

According to another aspect of the present invention, there is provided an information reproducing apparatus for reproducing information from an information recording medium, including: a designating unit for designating the record information piece to be searched, the kind of the related information corresponding to the record information piece to be searched and a search object text relating to the record information piece to be searched; a searching unit for searching for the kind information piece corresponding to the kind of the related information designated by the designating unit; a selecting unit for selecting record information related texts including the search object text out of the record information texts which include the kind information pieces detected by the searching unit, by using the text arrangement information pieces paired with the kind information pieces detected by the searching unit: obtaining unit for obtaining the logical position in the hierarchical structure and the related information of the record information piece corresponding to the record information related text selected, by referring to the corresponding layer information piece and other layer information pieces; a display unit for displaying the information related to the record information obtained by the obtaining unit; and a reproducing unit for reproducing the record information piece designated by the designating unit based on the logical position obtained by the obtaining unit.

In accordance with the reproducing apparatus thus configured, the searching unit searches for the kind information piece corresponding to the kind of the related information designated, and the selecting unit selects a record information related texts including the search object text. The obtaining unit obtains the logical position in the hierarchical structure and the related information of the record information piece corresponding to the record information related text selected. The reproducing unit reproduces the record information piece designated by the designated unit based on the logical position obtained.

According to still another aspect of the present invention, there is provided an information reproducing apparatus for reproducing information from an information recording medium, including: a designating unit for designating the record information piece to be searched and the kind of the related information corresponding to the record information piece to be searched; a searching unit for searching for the record information related text including the kind information piece corresponding to the kind of the related information designated by the designating unit and for a logical position in the hierarchical structure of the record information corresponding to the record information related text; a display unit for displaying the record information related texts detected by the searching unit; and a reproducing unit for reproducing the record information piece designated by the designating unit based on the logical position detected by the searching unit.

In accordance with the reproducing apparatus thus configured, the searching unit searches for the record information related text including the kind information piece corresponding to the kind of the related information designated and for a logical position in the hierarchical structure of the record information corresponding to the record information related text. The reproducing unit reproduces the record information piece designated by the designating unit based on the logical position detected by the searching unit.

According to still another aspect of the present invention, there is provided an information reproducing apparatus for reproducing information form an information recording medium, including: a designating unit for designating the record information piece to be searched and the sub-class of the information related to the record information piece to be searched; a searching unit for searching for the record information related texts including the classification mark part corresponding to the sub-class designated by the designating unit; an obtaining unit for obtaining the logical position in the hierarchical structure of the record information corresponding to the record information related text searched by the searching unit and the information related to the record information piece, based on the corresponding layer information piece and the other layer information pieces; a display unit for displaying information relating to the record information pieces detected by the searching unit; and a reproducing unit for reproducing the record information piece designated by the designating unit based on the logical position obtained by the obtaining unit.

In accordance with the reproducing apparatus thus configured, the searching unit searches for the record information related texts including the classification mark part corresponding to the sub-class designated by the designating unit. The obtaining unit obtains the logical position in the hierarchical structure of the record information corresponding to the record information related text searched by the searching unit and the information related to the record information piece, based on the corresponding layer information piece and the other layer information pieces. The display unit displays information relating to the record information pieces detected by the searching unit, and the reproducing unit reproduces the record information piece designated by the designating unit based on the logical position obtained by the obtaining unit.

According to still another aspect of the present invention, there is provided an information recording apparatus including: a first producing unit for producing a plurality of record information pieces logically independent of each other; a second producing unit for producing layer information pieces indicating one of a plurality of layers constituting a hierarchical structure and kind information pieces indicating kinds of information related to the record information pieces; a text producing unit for producing layer related texts describing information related to the layer indicated by the layer information pieces and record information related texts describing information related to the kinds of the information indicated by the kind information pieces; a first arranging unit for arranging the layer related texts and the record information related texts on an information recording medium successively in a mixed manner to form a text group; a third producing unit for producing text arrangement information pieces indicating positions of the texts within the text group; a second arranging unit for arranging the layer information pieces on the recording medium in an order in accordance with the hierarchical structure; a third arranging unit for arranging, on the recording medium, the kind information pieces in pair with the layer information pieces indicating the layer of the corresponding record information piece so as to specify a logical position of the corresponding record information piece within the hierarchical structure; and a fourth arranging unit for arranging the text arrangement information pieces, on the recording medium, in pair with one of the layer information piece and the kind information piece corresponding to the texts.

In accordance with the recording apparatus thus configured, the first arranging unit arranges the layer related texts and the record information related texts on an information recording medium successively in a mixed manner to form a text group. The second arranging unit arranges the layer information pieces on the recording medium in an order in accordance with the hierarchical structure. The third arranging unit arranges, on the recording medium, the kind information pieces in pair with the layer information pieces indicating the layer of the corresponding record information piece so as to specify a logical position of the corresponding record information piece within the hierarchical structure. The fourth arranging unit arranges the text arrangement information pieces, on the recording medium, in pair with one of the layer information piece and the kind information piece corresponding to the texts.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a table showing definitions of hierarchy description codes;

FIGS. 7A to 7C are tables showing definitions of application description codes;

FIG. 8 is a table showing definitions of application description codes related to genre;

FIG. 10 shows an example of description of item codes and item texts;

FIG. 12 shows another example of description of item codes and item texts;

FIG. 14 shows still another example of description of item codes and item texts;

FIG. 15 is a diagram showing a hierarchical layer structure configured by the description example shown in FIG. 14;

FIGS. 16A to 16C are tables showing definition of application description codes which include unique codes;

FIG. 17 shows a search table produced using the unique codes;

FIG. 23 shows an example of description of item text for genre.

DETAILED DESCRIPTION OF THE PREFERRED EMBODIMENTS

Referring to the accompanying drawings, embodiments of the present invention will be now explained. The following explanations will be done for the embodiment, in which the present invention is applied to the aforementioned DVD.

In the following embodiments, constitutional elements listed on a right hand side in a following list respectively construct examples of constitutional elements of the present invention listed on a left hand side in the following list.
Record information piece:
  Information unit on volume layer or the lower layers Text arrangement information piece: Text head pointer Kind information piece: Application description code Specific layer information piece:
  Text pointer (title address)
Uppermost layer information piece:
  Text pointer (volume address)
Object information piece: Search table
(I) Embodiment of Information Recording medium First of all, a physical structure and a logical structure as well as an operation of a DVD, as one embodiment of the information recording medium to which the present invention is applied, will be explained with reference to FIG. 1.

Figure 1:
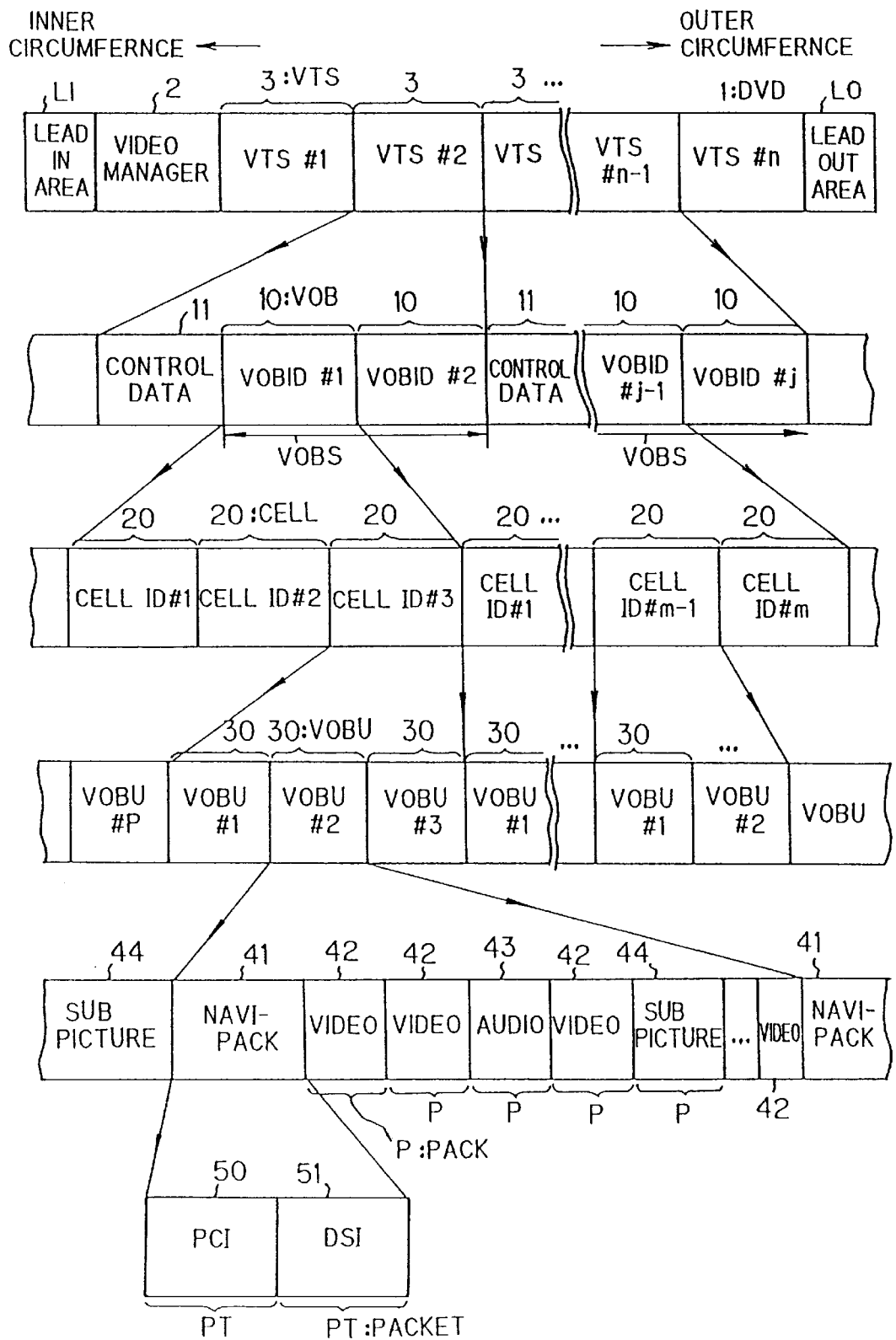
FIG. 1 is a diagram showing a physical structure of record information of a DVD as one embodiment of the present invention.

At first, a record format of video information and audio information on the DVD (i.e. a physical record format) is explained by use in FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n).

Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which language of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. In the video packs 42, which data amount is relatively large as shown in FIG. 1, one or a plurality of GOPs are recorded within one VOB unit 30. The audio pack 43 and the sub picture pack 44 are disposed intermittently between the video packs 42. It is prescribed by a standard specification of the DVD that there are 8 kinds of audio recordable on the DVD 1 while 32 kinds of sub picture recordable on the DVD 1.

Further, the video packs 42, the audio packs 43 and the sub picture packs 44 are recorded such that the reproduction time for one VOBU 30 (i.e., the reproduction time corresponding to data recorded between a navi-pack 41 and the next navi-pack 41 neighboring thereto) is equal to or longer than 0.4 second.

Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
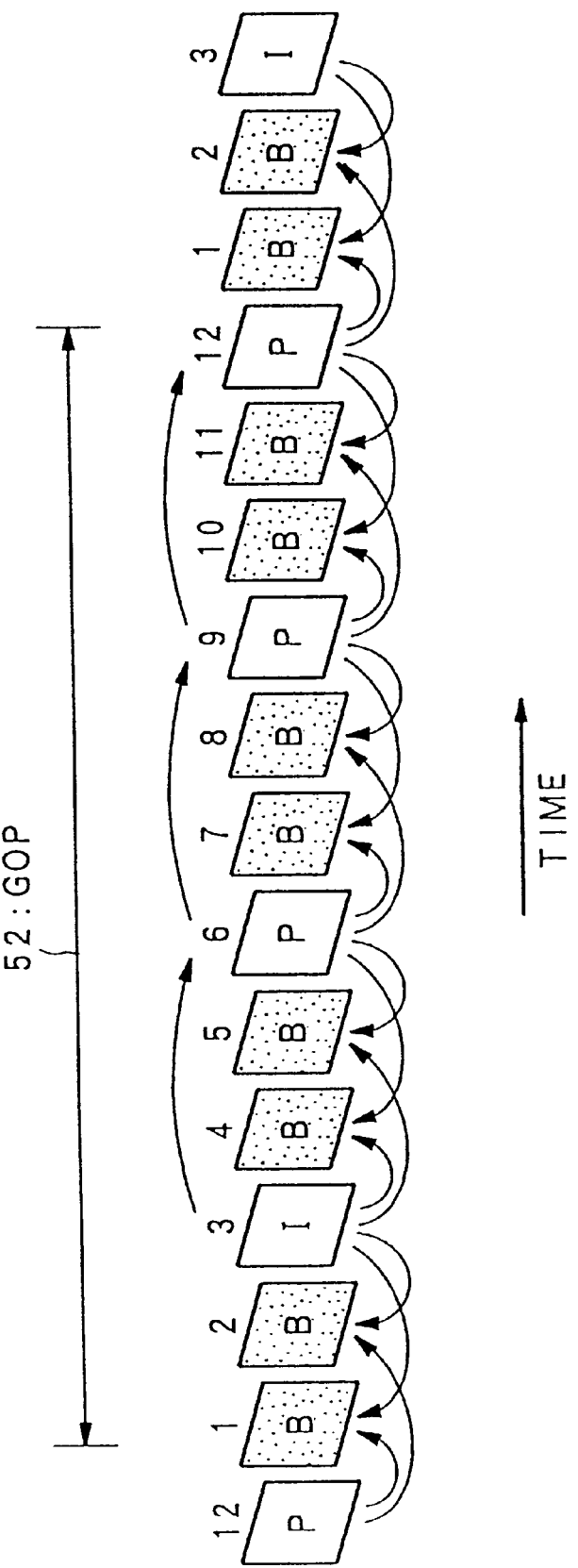
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG.

2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Neatly, a logical format (logical structure) constructed by combining the information recording by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
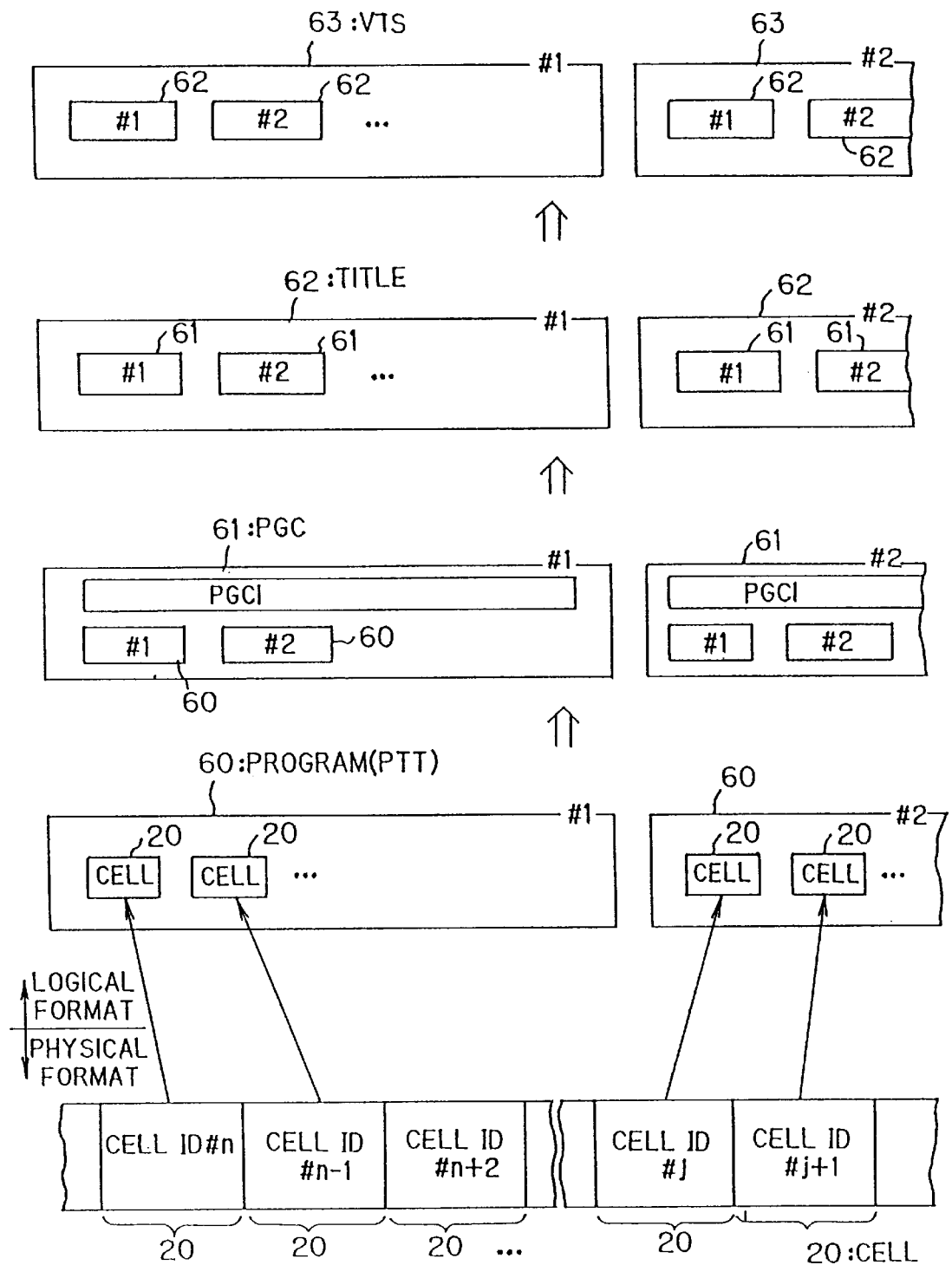
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program order (#1, #2, . . .) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC #2, . . .) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, #2, . . .) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
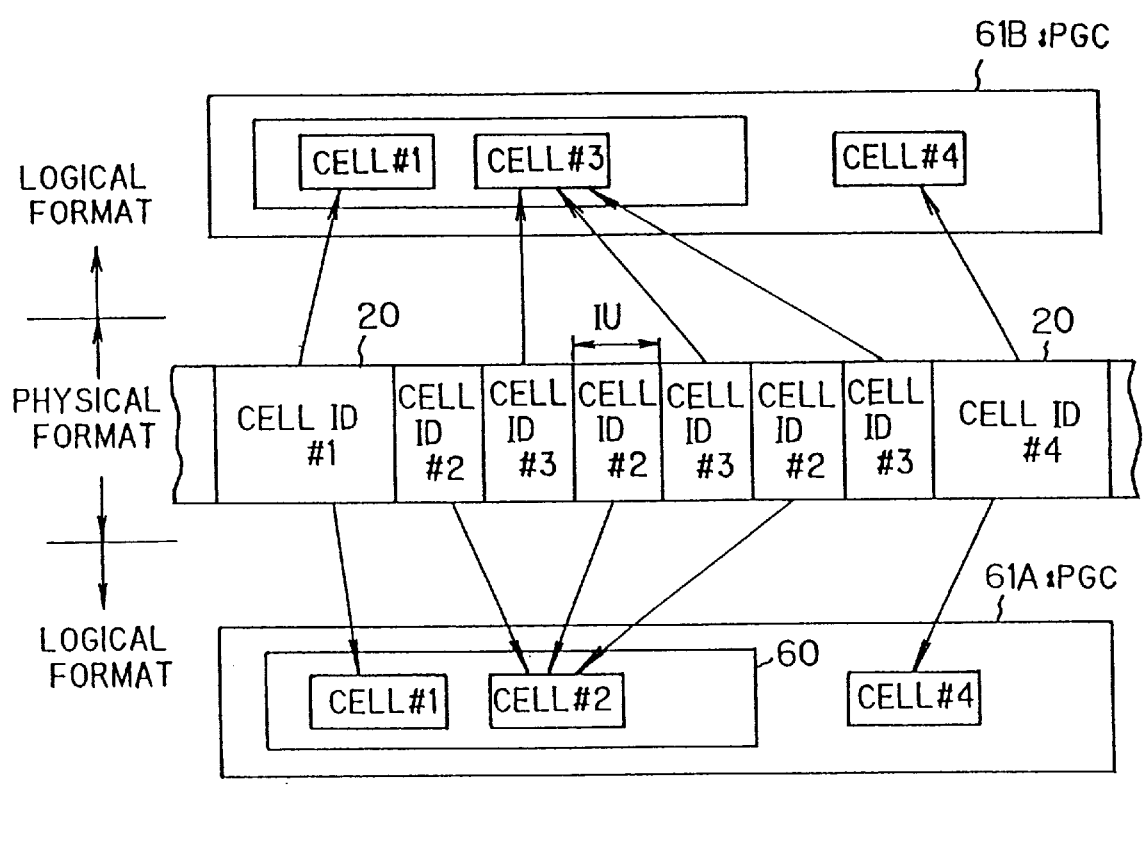
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID number 1, 3 and 4. In this case, at a time of reproducing the information from the DVD 1 on the basis of the PGC 61A, only the cells having the ID number 1, 2, and 4 are reproduced, while, at a time or reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that is possible for the audience to watch continuous reproduction video image.

Each interleaved unit IU is completed in one VCB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record information of various hierarchical layers, information according to the above-mentioned recording format is quite suitable for the DVD is which, in recording a movie, not only the information of the movie itself but also the sounds and/or subtitles, for various languages, of the movie are recorded on a single disk.

Next, the description will be given of a method of additionally recording text information (character information) on the DVD on which the video information and the audio information are recorded according to the above-mentioned physical and logical structures. Here, text information is character information relating to the video and audio information recorded on the DVD. For example, if a movie program is recorded on the DVD, the text information includes the character information of the names of the movie, the director, the main actors and/or actresses and so on, and if a music program is recorded on the DVD, the text information includes the character information of the names of the songs, the singers, the composers and so on. These information may be displayed on a monitor, and further may be used for the menu display and the search operation.

Figure 5:
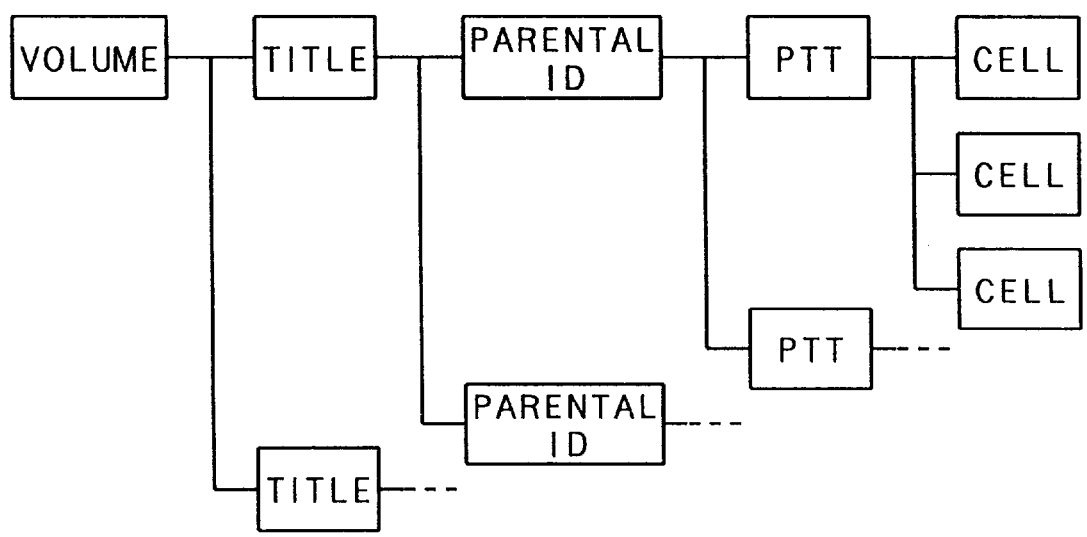
FIG. 5 is a block diagram illustrating a hierarchical structure by which text information is described and recorded.

The present invention is characterized in that each text is recorded in a manner being related to the hierarchical structure of the recorded video and/or audio information. In this view, first, the description will be given, with reference to FIG. 5, of the hierarchical structure to which the texts are related when the texts are recorded on the DVD. The physical and logical hierarchical structures of the video and/or audio information have already been described with reference to FIGS. 1 and 3. FIG. 5 shows the hierarchical structure to which the text information is related at the time of recording the text information on the DVD, and the hierarchical structure of the text information necessarily becomes, due to the nature of the text information, analogous to the logical structure of the video and/or audio information shown in FIG. 3. Therefore, it is understood that the text information is recorded in a manner substantially related to the hierarchical structure of the video and/or audio information.

In FIG. 5, the volume shown at the leftmost position is the highest (uppermost) layer, and the cell shown at the rightmost position is the lowest layer. The respective layers will be briefly described below. The "volume" is an information unit which is managed by one video manager 2. The "title" is an information unit which is arbitrarily determined by the author as described above. The "parental" represents a version of the recorded information when information of multiple versions, such as an adult-oriented version and a kids-oriented version for a single movie, are recorded. The "parental ID" is an information specifying one of the multiple versions. The "cell" and "PTT" has already been described.

In the present invention, the text information is recorded in such a manner that the correspondence of the text to the recorded information is clear. Namely, the text information is recorded so that it is clear as to which information recorded in which layer in the hierarchical structure shown in FIG. 5 the text information corresponds. For this purpose, the concept "item code" is introduced in the present invention. The title code is a code which indicates as to which layer the text corresponds to or what kind of information (i.e., contents) the text represents. The respective texts corresponding to the respective item codes are referred to as "item text", respectively. However, it is noted that there is an item code which has a corresponding item text and has no corresponding item text. In addition, plural item codes may correspond to a single item text. The item codes are classified into two kinds of codes, a hierarchy description code and an application description code. The hierarchy description code is a code which indicates as to which layer of the hierarchical structure in FIG. 5 the item text corresponds. The application description code is a code which indicates what kind of contents, related to the recorded video and/or audio information, the item text describes. Namely, the application description code represents the kind, the attribute and the like of recorded information.

FIG. 6 shows the examples of the hierarchy description codes which constitute one type of the item codes. As shown, the hierarchy description codes include the hierarchical codes, main-items codes and sub-item codes. The hierarchical code represents one layer in the hierarchical structure shown in FIG. 5. For example, the hierarchical code "0" represents volume, and the hierarchical code "4" represents cell. The main-item code and the sub-item code represent information related to the contents of the recorded video and/or audio information, although they are not directly related to the hierarchical structure of FIG. 5. Therefore, the main-item code and the sub-item code can be recognized as the supplemental layer related to each layer shown in FIG. 5. Concretely, the main-item code and the sub-item code include the code indicating that the information is an angle or an audio or a sub-picture, and a code indicating a channel of audio information. The angle corresponds to an angle of camera taking pictures for video information, and specifies one of the plural angles if the plural pictures are taken from the plural camera angles on a single time basis (i.e., for the same scene). For the title in which plural angles are prepared, a user can select one of them to be reproduced. The sub-picture is secondary picture such as lyrics in karaoke songs or subtitles in a movie. Although a hexadecimal code is assigned to each item code in practice, the hierarchy description code is represented as a decimal code in FIG. 6, for the sake of simplicity. The "<RESERVE>" represents a code which is not defined yet, and the "unique code" is a code which the author and/or producer of DVD can arbitrarily define.

FIGS. 7A to 7C show examples of the application description codes which are one type of the item code. As described above, the application description code indicates the kind of the contents of the corresponding item text. Concretely, as shown in FIGS. 7A to 7C, the application description codes include the series name, production name, the director of movie, the artist of music, the composer and the like. The contents represented by the application description code is referred to as "application item". The "CLASS" in FIGS. 7A to 7C indicates the classification of the application items. However, it is provided by the producer of the text information for the purpose of regulation, and hence it may be omitted. As shown, two kinds of application description codes, a full-name code and a sorting code, are assigned to each application item. The full-name code is a code used for the display of the item text, and hence the item text corresponding to the full-name code includes Chinese characters for Japanese (i.e., Kanji) and numbers and/or figures so that it can be displayed as recorded. (It is noted that, in the Japanese patent application corresponding to this application, the text includes words and/or phrases of Japanese Kanji characters (Chinese characters) normally used in Japan. Therefore, the full-name code corresponds to the text written by the characters including the Kanji characters so that they can be displayed as they are.) Contrary, the sorting code is a code used in the search operation utilizing the item text, and the item text corresponding to the sorting codes does not include Kanji characters. Namely, the sorting code corresponds to the text written in the form of the reading sound (pronunciation) of the words so that the search operation described later can be performed using the sorting code.

Next, out of the application items, the description will be specially given to the genre. In the examples of FIGS. 7A to 7C, the application items of the video genre, the music/karaoke genre and the sub genre are defined in the class "GENRE". The description of the item text corresponding to the application items in the class "GENRE" may be basically freely determined by the author or the like, similarly to the case of other application items. However, if the description of the item text corresponding to those application items is completely free and unlimited, it may be difficult to make the search operation using the application description code. For this reason, in view of the search operation, there is a method in which the description (i.e., contents) of the item text corresponding to the genre is slightly limited. One of two following methods may be employed to limit the description of the item text in this view.

The first method is to limit the contents of the item text corresponding to the application description code of "GENRE" to only some predetermined contents and obliges the author to select the contents from those predetermined ones when determining the item text. By this, the contents of the item texts corresponding to the application items of "GENRE" are regulated and the search operation using the item text can be advantageously performed.

The second method is to limit the manner of describing the description (contents) of the item text to a predefined style of "Mark+Characters". In this case, an item text pointer (described later in detail) points the head address of the "Characters" part of the item text thus defined. As the "Mark" part, figures of a limited byte number may be used. With this treatment, the search operation can be carried out using the "Mark" parts of the item texts, thereby facilitating the search operation. In addition, since the pointer of the item text is directed to the head of the "Character" part, only the "Character" part of the item text is displayed and the "Mark" portion of the text is not displayed. Using this method, since the "Mark" part exists as a hidden information, it may be used by only some special kind of DVD players. As described above, by applying the limitation or rule to the description of the item text corresponding to the "GENRE", the search operation may be more effective.

FIG. 8 shows an example of the above described second method using the "Mark+Character" style item text description. In this case, the item texts corresponding to the sorting codes in the class "GENRE" is of a style:

(Text code)+(Space code)+(Text data) The text data describes the reading sound (character without Kanji (Chinese characters)) of the contents corresponding to the "text code" or the detail thereof, and are used for the search operation by a general player. The text code is used for the search operation by the players of special types. It is also possible to describe the item text corresponding to the full-name code in the same style and to use the text code in them for the search operation and the text data for the display. In that case, the item text of the sorting may be omitted. The search operation will be described later in more detail.

Figure 9:
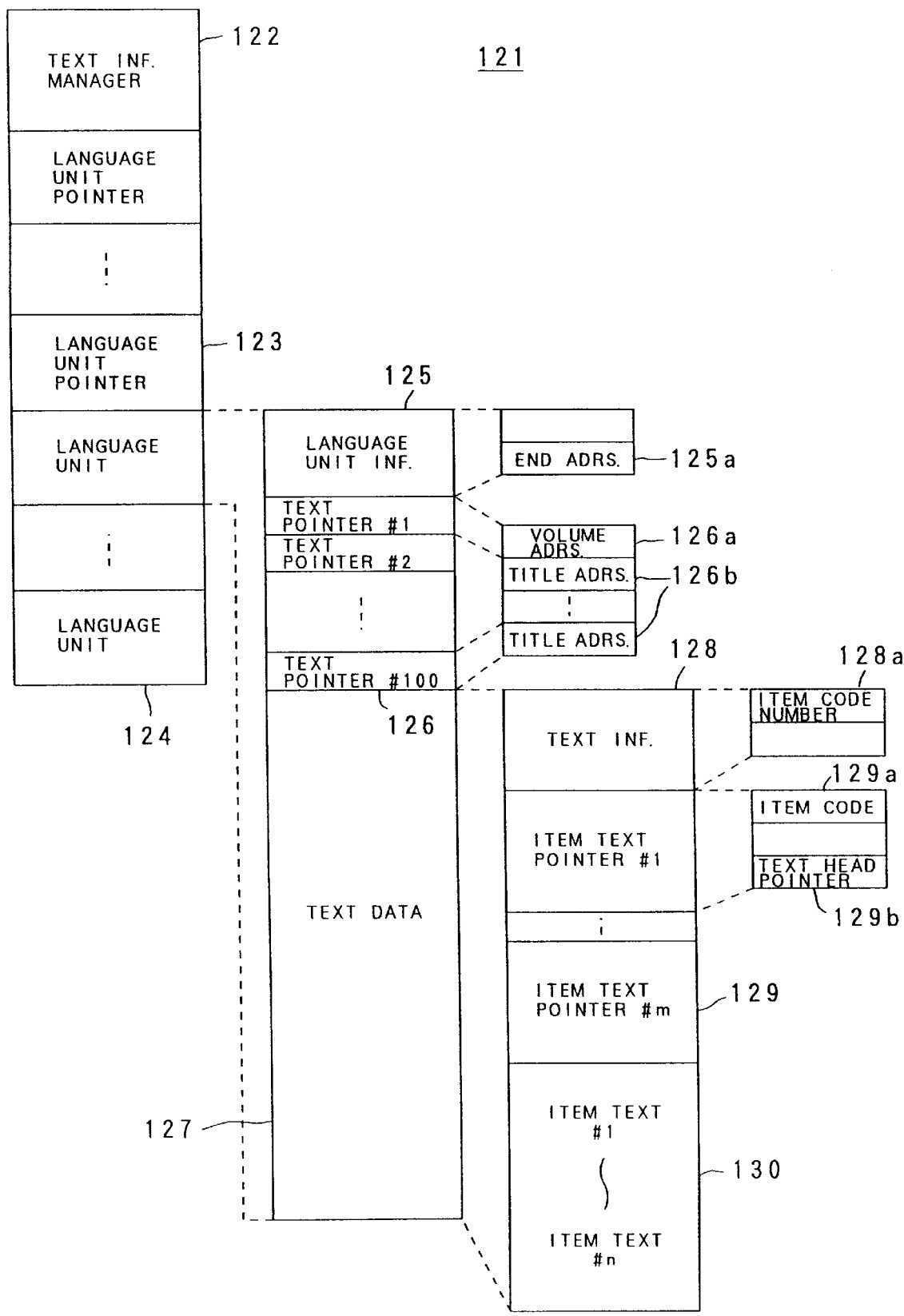
FIG. 9 is a diagram showing a structure of text information.

Next, the recording manner of the text information on the DVD 1 will be described. FIG. 9 shows the recording format of the text information. The text information 121 is recorded within the video manager 2 shown in FIG. 1. The text information 121 includes a text information manager 122, one or more language unit pointers 123 and one or more language units 124. The text information manager 122 includes an end position (address) of the text information manger 122 itself, and a number of the language units 124 under the management by the text information manager 122. The language unit 124 is a unit of text information described in one language. Namely, the number of the language units 124 corresponds to the number of the languages by which the text information is prepared and recorded. For example, if the text information is prepared by four languages, English, German, French and Japanese, the number of the language units 124 is four. The language unit pointer 123 is provided for each language unit 124, and includes information as to the language of the text included in that language unit 124. The language unit pointer 123 also includes information relating to the character code system (JIS, ISO, etc.) used in the description of the text in the language unit 124, and the recording address of the corresponding language unit 124 within the text information 121.

The language unit 124 includes a language unit information 125, a plurality of text pointers 126 and a text data 127. The language unit information 125 includes information relating to the contents of the language unit 124, e.g., an end address of the language unit 125 itself. The text pointer 126 indicates the recording position of an item text pointer 129 which is described with respect to the volume and the title.

The text data 127 includes a text information 128, a plurality of item text pointers 129 and an item text area 130. The text information 128 includes information relating to the text data 127, specifically information 128*a* (=m) of the number of item codes 129*a* in the text data 127. The item texts #1 to #n are comprised of data expressing the text, described with respect to the hierarchical layers or application items, in the form of a predetermined character code. By way of example, when the characters of "Gone With The Wind" is recorded as the production name of a movie, the character code sequence corresponding to the characters is recorded as the item text. The character sequence recorded as the item text is of variable length, and is recorded successively within the item text area 130 with a delimiter added at its end.

The item pointer 129 includes the item code 129*a* and a text head pointer 129*b*. The item code 129*a* indicates, as described above, the layer to which the item text corresponding to the item text pointer 129 belongs (in the case of hierarchy description code) or the contents of the corresponding item text (in the case of application description code). The text head pointer 129*b* represents the recording address, within the item text area 130, of the item text corresponding to the item text pointer 129 to which it belongs. As described above, the plural item texts #1 to #n are recorded successively within the item text area 130, and hence the respective item texts #1 to #n are specified by designating the recording address in the item text area 130 using the text head pointer 129*b*. If there exists an item text described in correspondence with the item text code, the item text pointer and the item text may be basically provided in one-to-one correspondence. Alternatively, if an identical item text is commonly and repeatedly used for plural item text pointers, a unique item text may be described in the item text area 130 and the plural item text pointers may be determined to designate the recording position of the unique item text. By this, the recording area in the item text area 130 may be efficiently used. The selection of the method of describing the item text in the item text area 130 is entrusted to the author who produces the text. As described later, there are item codes which have no corresponding item text, and therefore the numbers m and n are not always equal to each other.

The first item text pointer #1 specifies the item text which has the item code 129*a* indicating the hierarchical code indicative of the volume within the hierarchical structure, and the item text pointers #2, #3, . . . specifying the item texts relating to the volume follows the first item text pointer #1. Then, the item text pointer specifying the item text which has the item code 129*a* indicating the first title is recorded, and the item text pointers specifying the item texts relating to the first title follow. Then, the item text pointer specifying the item text which has the item code 129*a* indicating the second title is recorded, and the item text pointers specifying the item texts relating to the second title follow. Thereafter, the item codes 129*a* and the item text pointers are described for all existing titles in the same manner. By describing the item text pointers 129 in a grouped manner to constitute a group for each volume and/or title, it becomes easy to search for the item text on the volume and/or the title basis using the text pointer 126. The item text pointer 129 is always and necessarily described for the volume and titles. However, with respect to the item text pointers 129 which do not have corresponding item text, the text head pointer 129*b* in the item text pointer 129 is set to "0" as described later.

The text pointer 126 indicates the recording address, within the text data 127, of the item text pointer 129 corresponding to the volume and title. Namely, the volume address 126*a*, which is the contents of the text pointer #1, indicates the recording address, within the text data 127, of the item text pointer 129 having the item code 129*a* indicating the hierarchical layer "volume". The title addresses 126*b*, which are the contents of the text pointers #2 to #100, indicate the recording address, within the text data 127, of the item text pointers 129 having the item codes 129*a* indicating the hierarchical layer "title". If there is no corresponding title, the title address 126*b* is set to "0".

Figure 11:
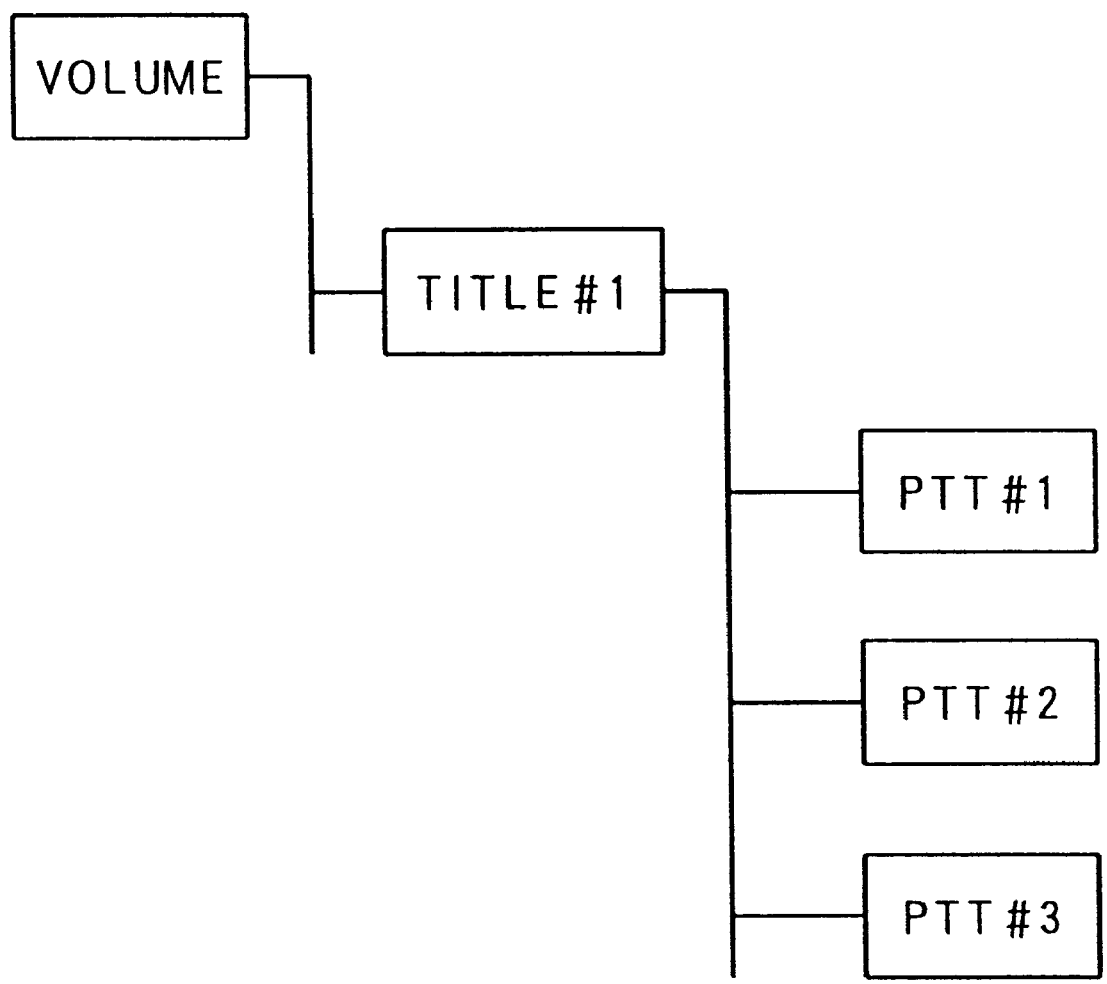
FIG. 11 is a diagram showing a hierarchical structure configured by the description example shown in FIG. 10.

Next, the relationship between the item code and the item text will be described with reference to the description examples. FIG. 10 shows an example of description of item codes, and FIG. 11 shows the hierarchical structure corresponding to the example of FIG. 10. It is noted that FIG. 10 shows the relationship of the contents of the item code, the item code and the contents of the item text for the purpose of explanation. In practice, the item code 129*a* is recorded at the position shown in FIG. 9 as the hexadecimal code, and the item text is recorded in the item text area 130 in FIG. 9 as sequence of character codes. In addition, the address indicating the recording position of the item text in the item text area 130 is recorded, in pair with the item code, in the item text pointer 129 as the text head pointer 129*b*. This is as described above.

By referring to FIG. 10, first, the item code "0" indicating the volume is described. Although the contents of the text in FIG. 10 is "<OPTION>", this means that certain characters may be described as the item text, and does not means that the word "<OPTION>" is described. The meaning of the <OPTION> is the same for the title and the PTT. If the item code is the application description code, the item text corresponding to the application item is basically always described. On the contrary, if the item code is the hierarchy description code, it merely represents the presence of the hierarchical layer indicated by the code and hence it is not necessary to describe the corresponding item text if the author does not think it necessary. If nothing is described in the corresponding item text in this way, "0" is described at the text head pointer 129*b* in the item text pointer 129.

Subsequently, the hierarchical code "1" indicating the title is described, and further there are described the application description codes indicating the production name, the director and the main actor, and the corresponding item texts. Since these item texts are recorded in pair with the hierarchy description code indicating the title (2nd line), it can be easily recognized that these item texts are described in relation with the title. Thereafter, since there are recorded the hierarchy description codes indicating PTT, it is recognized that another layer "PTT" exists under the layer "title" and that the item text corresponding to the application description codes of scene name (8th line) is described in relation with this PTT. In this example, there further exist two PTTs (9th line and 10th lines), and the item text with respect to the third PTT (10th line) is described in correspondence with the application description code of scene name. The hierarchical structure described by the example of FIG. 10 is shown in FIG. 11.

In the example of FIG. 10, only the full-name codes (see FIGS. 7A to 7C) are shown with respect to the application description codes. However, in practice, the sorting codes for the same application items may be described just after the full-name codes in the item code 129a (FIG. 9). For the sorting code, the characters (including no Chinese characters) are described as the corresponding item text in the item text area 130. Such text is described for the purpose of the search operation using the text information. Also in the following description examples in FIGS. 12 and 14, the illustration of the sorting codes of the application codes is omitted in the same manner. In addition, the line numbers in FIGS. 10, 12 and 14 are applied for the sake of explanation only, and are not coincident with the lines at which those texts are actually described in the item text area 130. This is same in the following FIGS. 12 and 14.

There are two rules for the describing manner of the item codes. The first rule is as follows:

A hierarchy description code can be omitted if all of the following conditions are satisfied:

(a) With respect to a hierarchical layer, there is no hierarchy description code branched from the identical higher layer.

(b) There is no item text in relation with the hierarchy description layer.

(c) There is no item text corresponding to the application item for the information unit which is related to the hierarchy description code.

For example, in the example of FIG. 10, there is only one parental-ID and there is no item text for the layer "parental-ID", the hierarchy description code of the parental-ID is omitted (refer to FIG. 10 and FIG. 5 for comparison). In addition to the first rule, even if there is other layer on the same hierarchical level branched from the higher layer, the hierarchy description code can be omitted if there is no item text in its own layer and in the layers at the same and lower hierarchical levels. This is why there is no description for the layers lower than the cell in FIG. 10.

The second rule is as follows:

All the hierarchy description codes for the information units must be described if all of the following conditions are satisfied:

(a) For a certain layer, there are plural information units which have the same higher layer at the layer of one level higher.

(b) At least one item text is described at any layers which are existing under the information units.

This is because, it is necessary to describe the hierarchy description code so as to indicate the presence of the information units at the layer even if the item texts do not exist in the respective layers. In addition, in each layer, the number of the information unit on the same hierarchical layer corresponds to the description order of the hierarchy description codes. Therefore, in the example of FIG. 10, although the there is not prepared an item text of the scene name of the second PTT (9th line), this hierarchy description code (i.e., "PTT" at 9th line) must be described, because, if this is omitted, the number of the PTT can not be recognized and the PTT #3 is erroneously regarded as PTT #2 in the case of FIG. 10. It is noted that the hierarchy description codes are always and necessarily described for the volume and the title.

Figure 13:
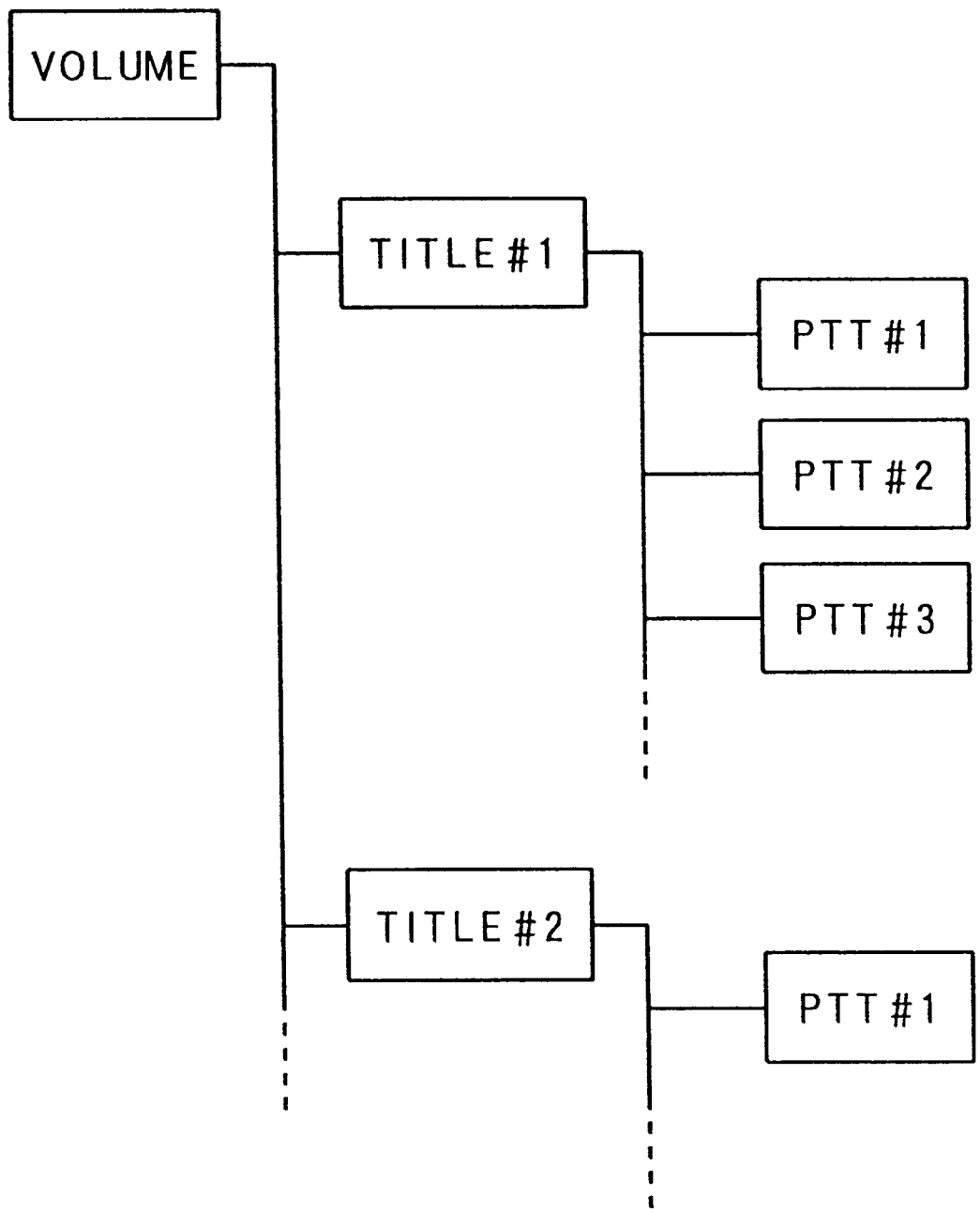
FIG. 13 is a diagram showing a hierarchical structure configured by the description example shown in FIG. 12.

FIG. 12 shows another example of the description of the item codes and the item texts. This example is directed to the case where audio information is recorded on the DVD. Since the data capacity of th audio information is generally much smaller than that of the video information, data of the plural CDs may be recorded on a single DVD. In the example of FIG. 12, one title corresponds to one album (i.e., one CD), and one PTT corresponds to one song. The hierarchical structure of this example is shown in FIG. 13.

Further, FIG. 14 shows still another example of the description of the item codes and the item texts. This example is directed to the karaoke song collection, and the hierarchical structure thereof is shown in FIG. 15. In this example, one title corresponds to one song, and there are recorded a song by a male singer and a song for duet. As the item text of the audio channel, the name of the vocalist for the vocal part recorded in the channel is described. Accordingly, for example, if the fifth channel (channel #5 in FIG. 15, lines 27 and 28) in the title #2 is selected, the user can enjoy the singing with Ootuki Miyako (Japanese female singer). Also in this example, the introduction part of the lyrics of the songs are described in the layer of PTT and cell (see. lines 30–31, 33–34).

As described above, according to the present invention, the item code, comprised of one of the hierarchy description code and the application description code, is recorded in pair with the item text, and further the hierarchy description codes of other hierarchical layers (levels) are described to identify the position of the corresponding information units within the hierarchical structure. Therefore, it is possible to recognize as to which information in which layer, within the hierarchical structure, the item text corresponds to and what is the contents of the item text. This enables recording the text information for arbitrary hierarchical layer so as to clarify the correspondence between the text information record and the information unit relating to the text information. In addition, since it is necessary to record the hierarchy description code which indicates the hierarchical layer and to which there exist corresponding texts, the recording capacity may be effectively used.

If there are plural information units on the same layer and only some of the information units from the beginning have the text information on the layers and on their lower layers, the hierarchy description codes may be omitted for the subsequent information units. This is because, since the number of the information unit corresponds to the description order of the hierarchy description code, the corresponding information unit can be identified even if the hierarchy description codes are omitted for those information unit.

Next, the description will be given of the method of defining unique codes as the application description codes. It has been described that the unique cods may be defined as the unique codes. The unique codes may be advantageously used for the search operation in which the recorded information is searched for using the text information. Namely, by describing a class or the like used for the search operation as the unique codes, the search operation can be smoothly performed. FIGS. 16A to 16C shown an example in which the classes used for the search operation are defined using the unique codes. In FIG. 16C, the classification by the first one Japanese letter is made for the names of the artists (singers), and the classes are defined using the unique codes. Specifically, ten unique codes corresponding to Japanese letter columns are provided. Here, the artist name is classified by their first Japanese letter. For example, the first Japanese letter of the artist name "HORIUCHI TAKAO" is "HO", and hence this name belongs to the Japanese letter column "は (HA)", i.e., the full-name code 234 and the sorting code 235 (Japanese letter column "は (HA)" includes five Japanese letters, "は (HA)", "ひ (HI)", "ふ (HU)", "へ (HE)", "ほ (HO)"). In addition, it is ruled that the item texts for the item codes thus defined are described in the style shown in FIG. 17, i.e., (SINGER NAME)_(SONG NAME)_(TITLE No.). By describing the item text using the unique codes, the reproducing apparatus can pick up the item texts corresponding to each unique code and product a search table as shown in FIG. 17, thereby enabling the rapid search and display of the search result. For example, in order to enable the search within the range of volume, the item codes of the unique codes are described together at the layer of the volume. Further, the combination of the item codes and the item texts as shown in FIG. 17 may be recorded on the other area which is used by the reproducing apparatus of some special types.

If the search for the singer whose name begins with Japanese letter "あ (A)", is made without the above description using the unique codes, the reproducing apparatus first searches for the item code "101" for sorting, corresponding to "あ (A)", makes the list including the item texts which have the Japanese letter "あ (A)" at the first letter from the item texts corresponding to the sorting code "101", and then displays the result. Therefore, in order to search for the character in the item texts, the search must be made in the item text area 130 every time by referring to the item text pointer 129, thereby requiring a long processing time. On the contrary, if the classes for the search is recorded in advance using the unique codes, the search table like the one shown in FIG. 17 can be readily produced. Therefore, it is unnecessary to refer to the contents of the item texts every time the search is made, thereby enabling rapid search operation. The detailed description of the search operation will be described later.

(II) Embodiment of Recording Apparatus

Next, an embodiment of recording apparatus for recording the above mentioned control information, video information and audio information onto the DVD 1 will be explained with reference to FIG. 18.

At first, a construction and an operation of the recording apparatus as the embodiment is explained with reference to FIG. 18.

Figure 18:
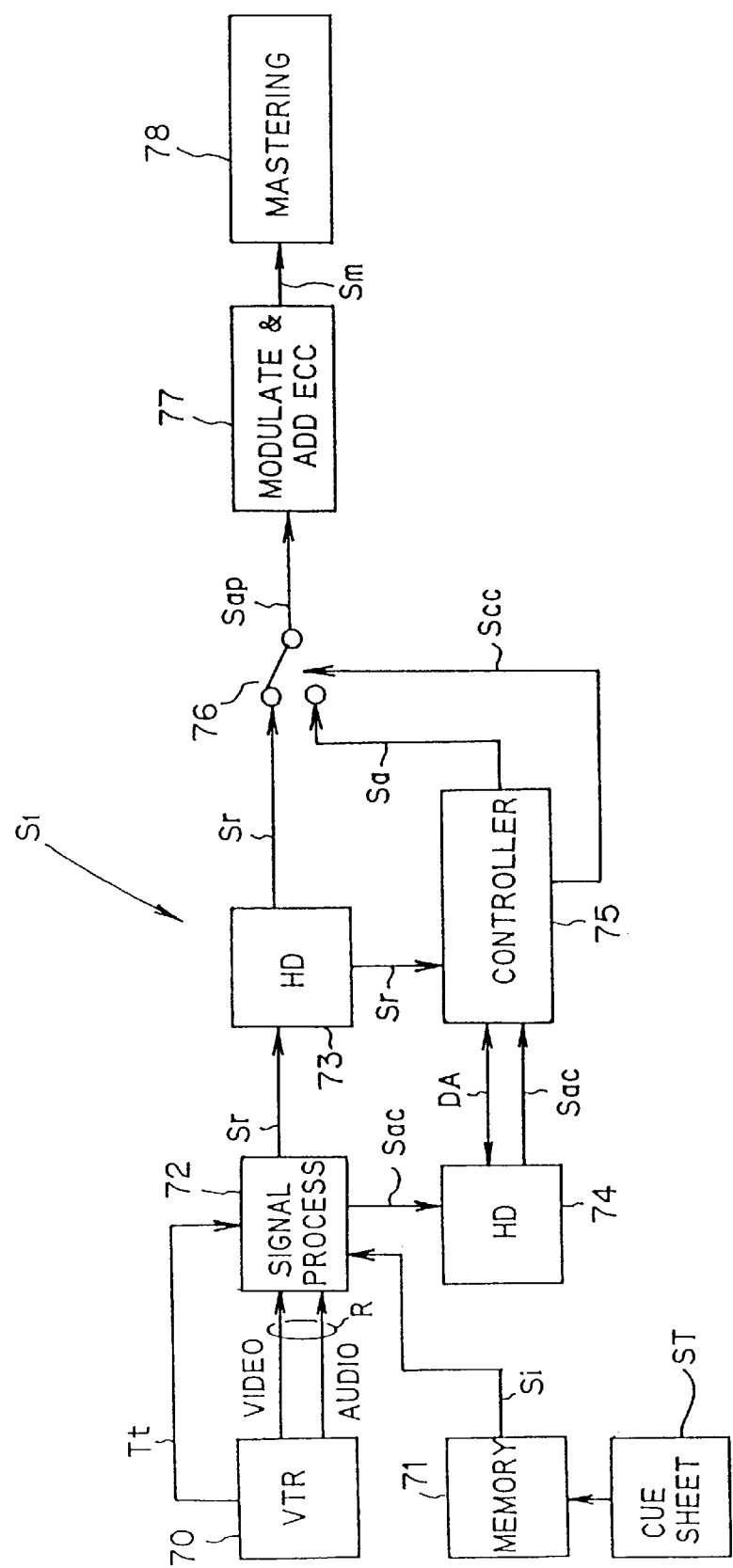
FIG. 18 is a block diagram of an information recording apparatus for recording the DVD in FIG. 1.

As shown in FIG. 18, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classified the record information R into a plurality of partial record information Pr in advance, and temporarily stores content information related to the partial record information Pr which is inputted beforehand on the basis of a cue sheet ST, on which control information related to the respective partial record information Pr are written. Then, the memory 71 outputs it as a content information signal Si on the basis of a request from the signal process unit 72. Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74. The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74.

The concrete contents of the text information 121 is determined by the author and/or the producer. This is carried out in the following manner. First, the author determines the contents of the text information to be recorded and the correspondences between the text information and the item codes. Then, the author successively describes the text information in the item text area 130 as the item texts, and records the recording addresses of the text information, as the text head pointer 129b, together with the item codes. Thereby, item texts and plural item text pointers 129 are produced. Thereafter, the author produces the text information 128, the text pointers 126, the language unit information 125 and so on the basis of the item texts and the item text pointers 129 thus produced, thereby completing the production of the language units 124. The above process is performed for each language independently. Finally, the language unit pointers 123 for plural language units 123 and the text information manager 122 are produced. By this, the production of the text information 121 is completed.

The text information 121 thus produced is temporarily sorted in the hard disk device 74, and then included in the additional information DA by the control of the signal processing unit 72. Namely, the text information is included in the additional information DA as the information to be recorded in the video manager 2. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal SCC to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed Sap. In the form of the information added compressed multiplexed information Sap, the information to be recorded is produced by multiplexing the control information and the video and/or audio information according to the switching control by the information selection signal Scc from the controller 75, and is of the physical structure (physical format) as shown in FIG. 1. If there exists the sub picture information to be recorded, it is inputted by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk records signal Sm to a stamper disk, which becomes a maser (i.e. a cutting dye) for the production of an optical disk. Then, by use of this stamper disk, an optical disk as a replica disk, which can be on sale in the general market, i.e. the DVD 1, can be produced by a replication device not illustrated.

In this manner, there is produced a DVD on which the text information 121 having the structure shown in FIG. 9 is recorded in the video manager 2.

(III) Embodiment of Reproducing Apparatus

Next, an embodiment of reproducing apparatus for reproducing the information recorded on the DVD 1 by the above mentioned recording apparatus will be explained with reference to FIGS. 19 to 22.

At first, a construction and an operation of the reproducing apparatus as the embodiment is explained with reference to FIG. 19.

Figure 19:
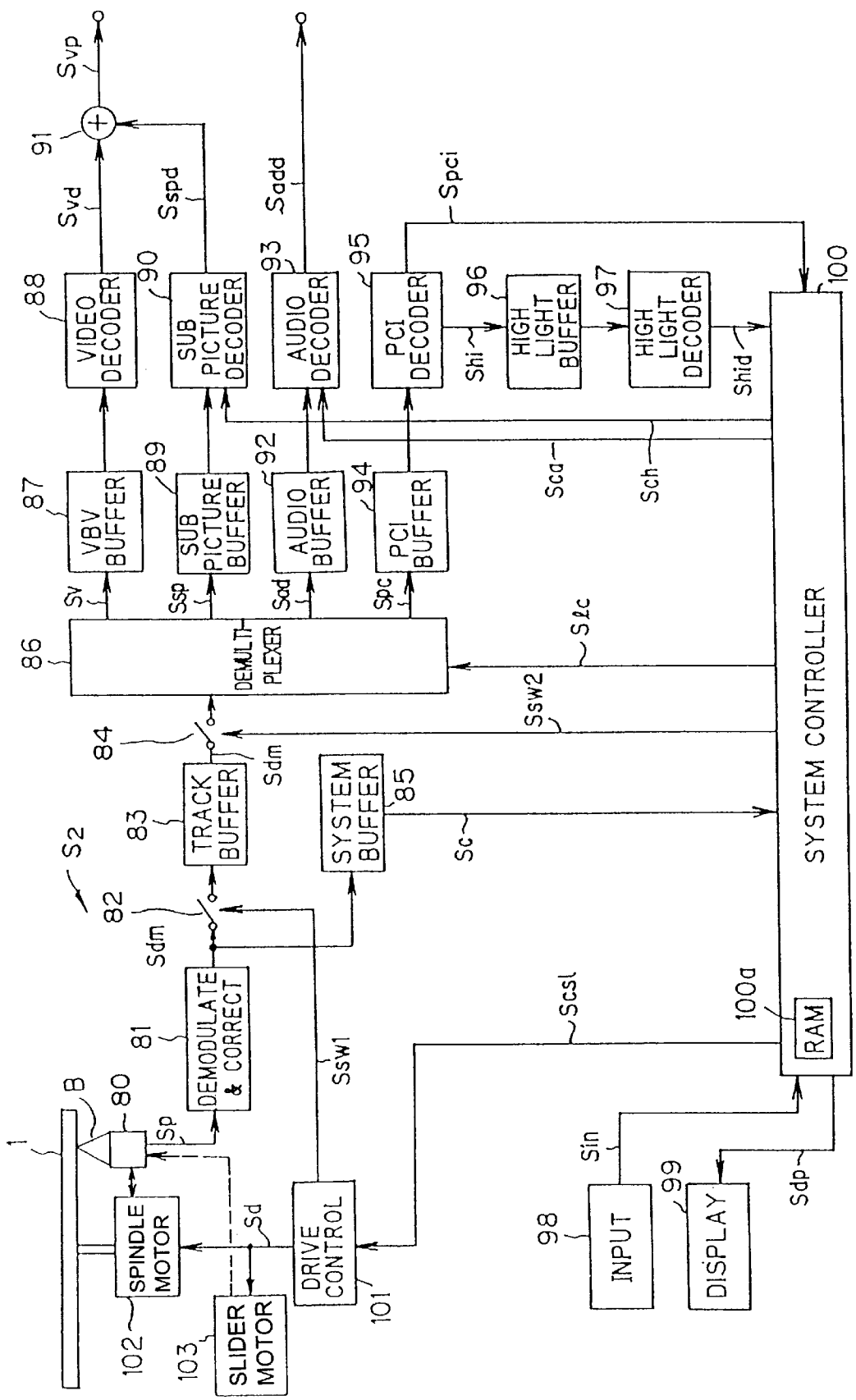
FIG. 19 is a block diagram of an information reproducing apparatus for reproducing the DVD in FIG. 1.

As shown in FIG. 19, a producing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 9 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective leans, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example, The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MEPG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc. The text information 121 included in the video manager 2 is temporarily stored in th system buffer 85, and is supplied to the system controller 100 as the control information Sc. The system controller 100 stores these information in the RAM 100a.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the subs picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio to sub picture information by a stream selection signal Slc from the system controller 100, so that the audio to sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video codecoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91. In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scs1 corresponding to the track jump process, to the drive controller 101, when it detects by the control signal Sc etc. that it is necessary to perform the track jump process such as a search in order to perform the seamless reproduction. Then, the drive controller 101, to which the seamless control signal Scsl is imputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 9), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, out of the operations of the reproducing apparatus S2, the description will be given of the search and reproduction operations using the text information. In the reproducing apparatus S2 according to the present invention, it is possible to search for the recorded video and/or audio information using the text information recorded. The search and reproduction operations using the text information will be described below.

Figure 20:
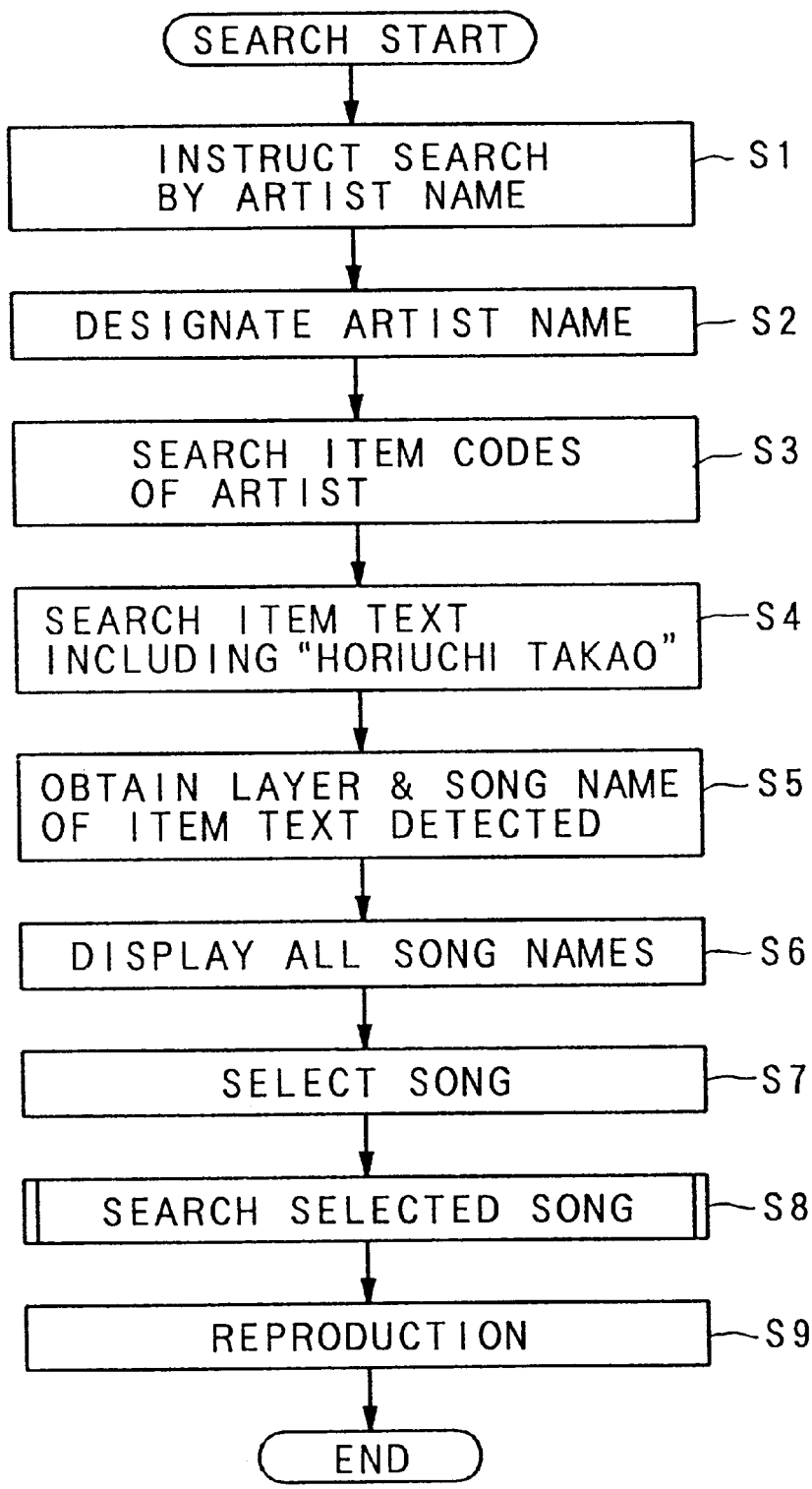
FIG. 20 is a flowchart showing a search operation using text information.
Figure 21:
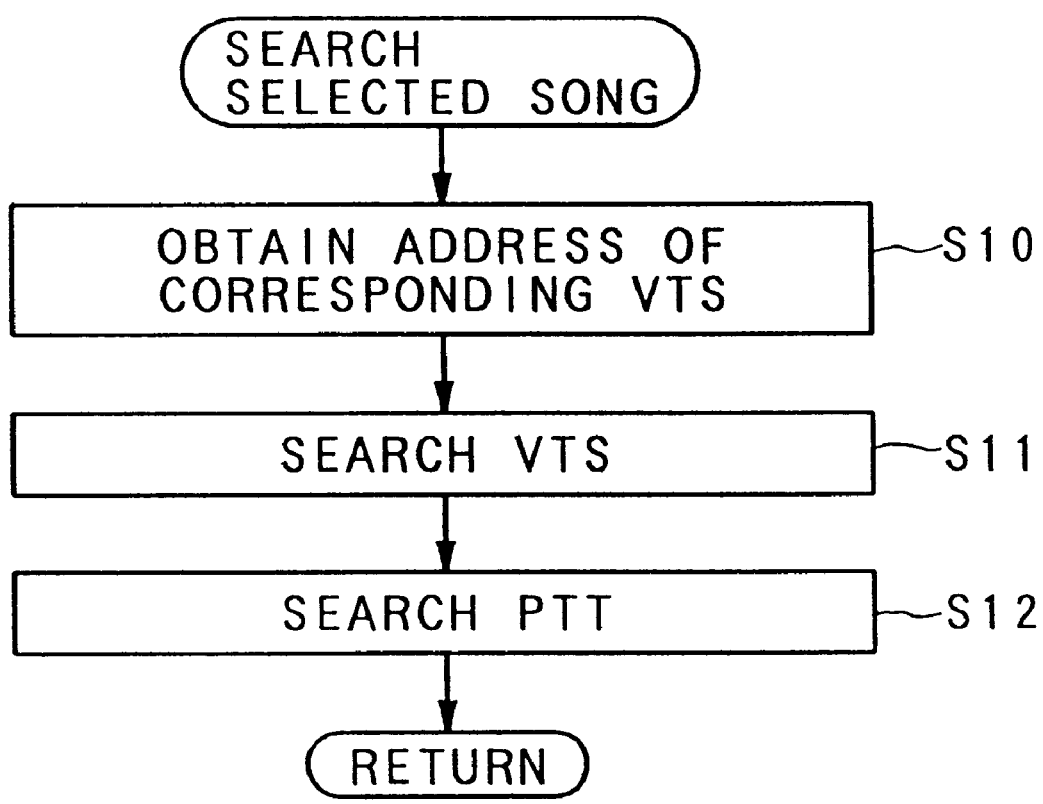
FIG. 21 is a flowchart showing the song search step in FIG. 20.
Figure 22:
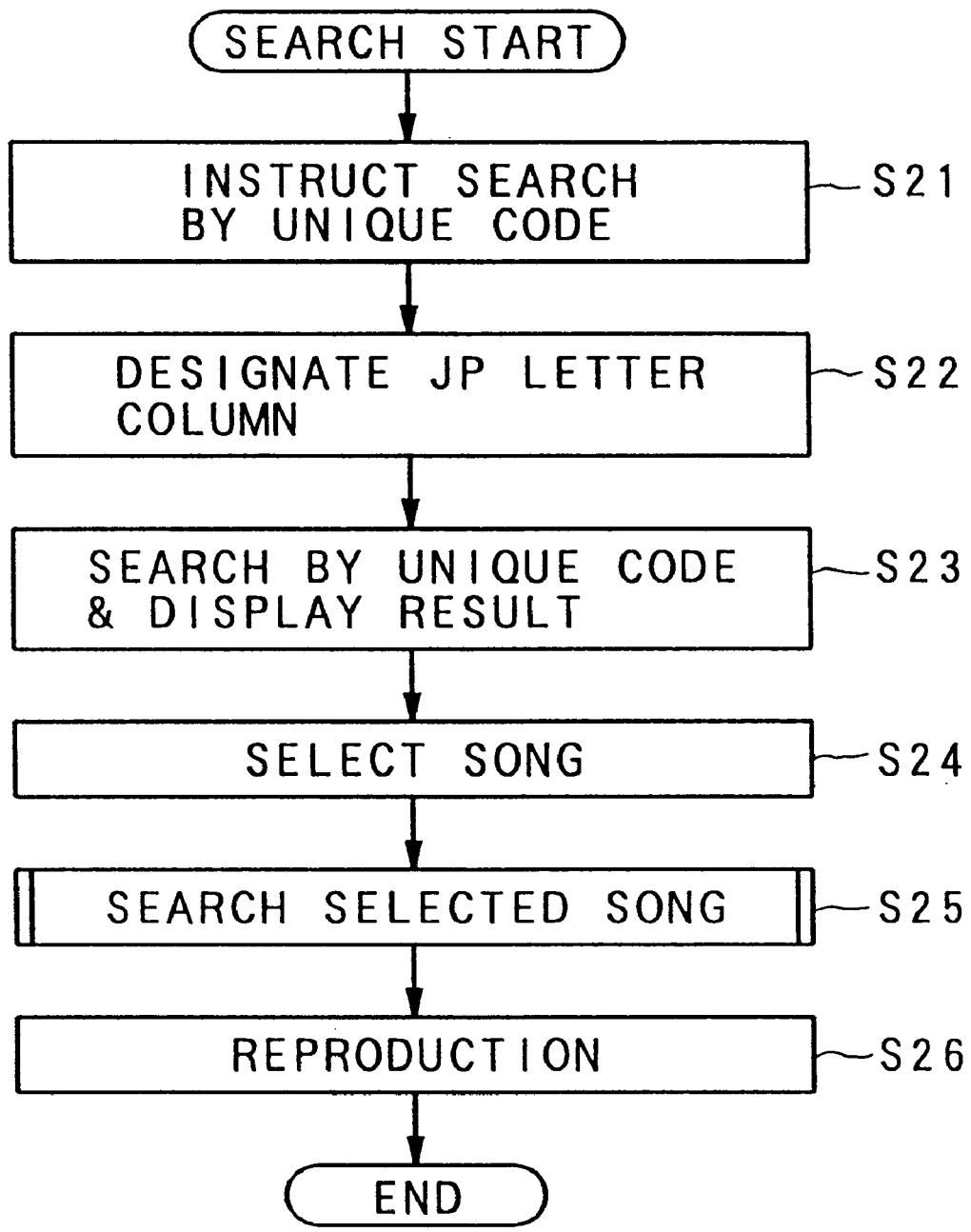
FIG. 22 is a flowchart showing a search operation using unique codes.

FIGS. 20 and 21 are the flowcharts showing the search operations using the text information. Now, it is assumed that the text information 121 is described as shown in FIG. 14, and a user searches for and reproduces the song "DREAMY ROUNDABOUT" sung by the artist (singer) "HORIUCHI TAKAO" (see. 7th and 8th lines in FIG. 14). First, the user instructs, via the input unit 98, to make the search for the song using the name of the artist (step S1), and then designates the name of the artist "HORIUCHI TAKAO" (step S2). In this case, the name of the artist may be inputted by the user via the keyboard or the like, and alternatively may be designated by selecting the candidates of the artists to be selected which are displayed on the monitor in the order of the beginning letter or the like. When the name of the artist is designated, the system controller 100 accesses to the text information 121 stored in the internal RAM 100a to find out all item text pointers 129 which include item codes corresponding to the name of the artist (step S3). Specifically, the system controller 100 picks up all the item text pointers 129 which item codes 129a (sorting code) are "101", indicating the artist's name (see FIG. 7A).

Next, the system controller 100 refers to the text head pointer 129b for all item text pointers 129 thus found so as to read the corresponding item texts, and finds out all the text pointers 129 corresponding to the item texts in which the name "HORIUCHI TAKAO" is described (step S4). Then, the system controller 100 refers to the item texts thus found and also to the other item texts corresponding to the same hierarchy description code, and obtains the song names and the hierarchical layers (step S5). In this example, since the item text pointer 129 corresponding to the 8th line of FIG. 14 is found in step S4, the system controller 100 reads the item texts corresponding to the item text pointers around it (6th, 7th lines), and recognizes that the song name is "DREAMY ROUNDABOUT" and that the song is on the layer of "title" because there is no description of PTT between the description of the title and the subject (song name) (i.e., there is no line between 7th and 8th lines). Further, the system controller 100 recognizes the number of the title of that song counted from the first title by searching the item text pointers 129 corresponding to the title from the head of the item text pointer 129. It is noted that, as for the title, the number of the title can also be recognized by referring to the address of the corresponding item text pointers 129 by using the title address 196b in the text pointer 126. If plural PTTs are included in the title, the descriptions of those PTTs can be obtained by the search, and hence the position of the song thus found within the hierarchical structure can be correctly recognized in any cases. When the hierarchical layers and the numbers and the names of the songs which artist is "HORIUCHI TAKAO" recognized in this way, the system controller 100 displays all of the song names on the display 99 (step S6). The user selects the song "DREAMY ROUNDABOUT", which he was looking for, from the list of the songs on the display 99 (step S7. When the user selects the song, the system controller 100 searches for the audio information of the song on the basis of the information relating to the hierarchy of the audio information, such as the title, PTT, etc., corresponding to the song (step S8).

FIG. 21 shows the method of the search performed in step S8. First, the system controller 100 makes the title search based on the title obtained. Concretely, the system controller 100 refers to the title search pointer table provided in the video manager 2 to acquire the recording position (recording address) of the VTS corresponding to the title (step S10). The title search pointer table is a table which represents the relationship between the titles and the recording positions on the DVD of the VTS corresponding to the titles. Then, the system controller 100 searches for the VTS on the basis of the address thus obtained (step S11). When the search of the corresponding VTS is finished, the system controller 100 makes the PTT search on the basis of the information of PTT previously obtained (step S12). Concretely, the system controller 100 refers to the PTT search pointer table recorded in the VTS, and obtains the PTT search pointer which indicates the recording address of the PGC corresponding to the PTT thus obtained. In this example, since the title is searched for, the search pointer of the PTT at the head of the title is obtained. Then, the system controller 100 obtains the PGC corresponding to the song "DREAMY ROUNDABOUT" on the basis of the search pointer thus obtained, and returns to the main routine of FIG. 20. Thereafter, the system controller 100 reproduces the designated song on the basis of the PGCI thus obtained (step S9). In this way, the search operation using the text information is performed.

As described above, according to the present invention, necessary minimum hierarchy description codes are described, and text information is recorded in pair with the information indicating the layer of the corresponding information unit, and further the other information are also recorded so as to identify the recording position in the hierarchical layers. Therefore, the hierarchical layer of the information unit and its number in the layer can be recognized, thereby enabling the search operation using the text information easily.

In the above example, the application item "artist" is used for the search operation. However, any other application items such as the name of the composer, the main actress and the like may be used for the search operation in the same manner.

Next, the description will be given of the example in which the search operation is performed using the unique codes defined within the application description codes. Now, it is assumed that the unique codes are defined within the application description codes as shown in FIG. 16C, and that the item texts corresponding to those unique codes are described in the style shown in FIG. 17. In this case, the reproducing apparatus S2 produces the search table, as shown in FIG. 17, using the unique codes from the text information recorded on the DVD, and stores it in the memory of the like, e.g., in the RAM 100a. Namely, the reproducing apparatus S2 prepares the list in which item texts corresponding to the full-name codes 224 to 242 are arranged in the order of the Japanese letter (from the first column starting "は (A)" to the last column "ゎ (WA)"). When the user searches for the song "DREAMY ROUNDABOUT" by the singer "HORIUCHI TAKAO", he designates the search using the unique code (step S21), and then designates Japanese letter column to which the beginning letter "HO" of the artist's name, "HORIUCHI" belongs (step S22). Then, the system controller 100 refers to the search table shown in FIG. 17, finds out the item codes corresponding to the Japanese letter column of "HA" which item code is "234", and displays the corresponding item texts on the display 99 (step S23). In this case, however, the title numbers at the end of the item text (see FIG. 17) are not displayed. The list displayed includes the pairs of the name of the artist and the song name as shown in FIG. 17, and the user sees them and selects the pair of "HORIUCHI TAKAO" and "DREAMY ROUNDABOUT" (step S24).

After the designation by the user, the system controller 100 obtains the title number described at the end of the item text (see FIG. 17), and makes the search to reproduce the song (steps S25 and S26). The operations in steps S25 and S26 are the same as the operation in steps S8 and S9 in FIG. 20.

By making the search using the unique codes as described above, the system controller 100 does not have to read the contents of the item texts and can obtain the object of the search immediately, thereby enabling the rapid search. Although the unique codes are defined for the Japanese beginning letter the artists in the above example, other application items such as the names of songs, movies or English begging letters can be defined as the unique codes to enable the search using those application items. By way of example, in the case of English beginning letter, the unique codes for the alphabet letters A to Z are defined, and the item texts are described in the style: (artist name_song name_title No.) as shown in FIG. 17. By designating the beginning alphabet letter of the artist, the search can be made in the same manner. In this way, it is possible to achieve the quick search if the author of the DVD defines in advance the unique codes which the user may use in the search operation.

If the number of the application items used for the search, such as the artist's name and so on, is small, the item texts may be described directly as shown in FIG. 17, without using the unique codes. In that case, it is preferred that the song names and/or the search targets are described with inserting the ending code (the space code) after the artist's name in the item texts. By this, a general player can read out the artist names only, and the players of special type can use the other information. In this case also, the item codes and item texts may be described in the normal describing rule, and alternatively the item texts may be described in a special areas.

Next, the description will be given of the search operation in the case where the item text of the genre is constituted by the combination of the text code and the text data as shown in FIG. 8. FIG. 23 shows examples of the description of the full-name item texts for music and karaoke genre. Similarly to the other item codes and item texts, the item codes are described in the predetermined positions 129*a* in the item text pointer 129 according to the hierarchical structure, and the item texts are described at the positions in the item texts are 130 indicated by the corresponding text head pointers 129*b*. In this case, the text head pointers 129*b* indicate the head of the text data after the text codes (3 digits figure) and the space code. The contents of the text data is freely determined dependently upon the author, and is read out and displayed as the text information of the music/karaoke genre corresponding to a certain information unit in accordance with the text head pointer 129*b*. The text code at the head portion of each item text is the 3 digits figure of fixed length prescribed in accordance with the classification in FIG. 8, and the special DVD player in conformity with the search operation using the text code knows the correspondences shown in FIG. 8. Therefore, when a song is searched for by designating a genre name, the DVD player displays the genre names corresponding to the text codes to invite the user's selection, searches for the text codes from the item text area 130, instead of searching for the designated genre name, thereby easily acquire the information related to the target song (e.g., song name, singer name, heirarchical layer as the order in the layer, etc.). The display for inviting the user's selection may be the display of the genre and the text codes, instead of the genre name only as described above, so as to allow the user to designate it by directly inputting the text code. Alternatively, the correspondence table in FIG. 8 may be printed on the jacket of the DVD or the like so as to allow the user to make the designation by referring to the jacket on which the table is printed. The method of designating and reproducing the song after acquiring the information related to the song is the same as the case of other examples.

As described above, by constituting the item text by the combination of the text code and the text data like the manner shown in FIG. 8, the item text to be displayed and the text code used for the search operation can be separated. Therefore, the text to be displayed can be freely determined while the speed of the search operation can be improved.

In the above described embodiments, the text information describes the hierarchical structure lower than the volume layer. However, the layers higher than the volume layer, such as the disc set, disc, disc side may also be described in the text information. In that case, as the method of the description, the hierarchy description codes may be assigned to each layer from the highest layer in the same manner as the embodiment described above. Alternatively, the layers higher than the volume layer may be described using the unique codes. In the latter method, a general player can use the layers equal to and lower than the volume layer, and a special player (such as a disc changer) can use the layers higher than the volume layer to make a search over the plural discs and/or disc sides. Therefore, the function of the player may be enhanced while maintaining the compatability to the general DVD players.

What is claimed is:

1. An information recording medium having a management information area and recording information area, the recording information area including a plurality of record information pieces constituting a hierarchical structure comprising a plurality of hierarchical layers;

the management information area including:

a layer information piece for specifying one of the plurality of hierarchical layers;

a kind information piece for indicating a kind of information relating to one of the record information pieces;

a text group including a plurality of text information comprising a plurality of layer related texts and a plurality of record information related texts, at least one of the plurality of layer related texts describing information related to the layer specified by the layer information piece, and at least one of the plurality of record information related texts describing information related to the kind of information indicated by the kind information piece; and a text arrangement information piece, arranged in pair with one of the layer information piece and the kind information piece, indicating a position of a text information corresponding to the paired one of the layer information piece and the kind information piece.

2. The medium according to claim 1, wherein the layer information piece is arranged in an order in accordance with the hierarchical structure, and the kind information piece is arranged in pair with the layer information piece specifying a hierarchical layer of the record information piece corresponding to the kind information piece so as to specify the position of the corresponding record information piece within the hierarchical structure.

3. The medium according to claim 1, further comprising at least one specific layer information piece indicating a recording position of the layer information piece corresponding to a specific layer out of the plurality of hierarchical layers.

4. The medium according to claim 1, further comprising an uppermost layer information piece indicating a recording position of the layer information piece corresponding to the highest layer out of the plurality of hierarchical layers.

5. The medium according to claim 1, wherein the record information pieces comprise video information, audio information, and sub-picture information recorded in a multiplexed manner.

6. An information reproducing apparatus for reproducing information from an information recording medium having a management information area and recording information area, the recording information area including a plurality of record information pieces constituting a hierarchical structure comprising a plurality of hierarchical layers;

the management information area including:
   a layer information piece for specifying one of the plurality of hierarchical layers;
   a kind information piece for indicating a kind of information relating to one of the record information pieces;
   a text group including a plurality of text information comprising a plurality of layer related texts and a plurality of record information related texts, at least one of the plurality of layer related texts describing information related to the layer specified by the layer information piece, and at least one of the plurality of record information related texts describing information related to the kind of information indicated by the kind information piece;
   a text arrangement piece, arranged in pair with one of the layer information piece and the kind information piece, indicating a position of a text information corresponding to the paired one of the layer information piece and the kind information piece, said apparatus comprising:
   reading means for reading the information recording medium thereby obtaining a read signal;
   demodulating means for demodulating the read signal thereby obtaining a demodulated signal;
   detecting means for detecting, from the demodulated signal, the text group; and
   displaying means for displaying information corresponding to at least a portion of the text information within the text group.

7. The apparatus according to claim 6, further comprising:

selecting means for selecting information displayed by the displaying means; and reproduction control means for reproducing a record information piece corresponding to the information selected by the selecting means.

8. The apparatus according to claim 6, wherein the record information piece comprises video information, audio information and sub-picture information recorded in a multiplexed manner, the apparatus further comprising:

a video decoder for decoding the video information;

an audio decoder for decoding the audio information; and a sub-picture decoder for decoding the sub-picture information.

* * * * *